US006628839B1

(12) United States Patent
Komiya et al.

(10) Patent No.: US 6,628,839 B1
(45) Date of Patent: Sep. 30, 2003

(54) IMAGE CODING SYSTEM CONVERTING APPARATUS, IMAGE CODING SYSTEM CONVERTING METHOD, AND RECORDING MEDIUM

(75) Inventors: Daisaku Komiya, Tokyo (JP); Tsutomu Uenoyama, Kanagawa (JP); Osamu Iwasaki, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/510,999

(22) Filed: Feb. 22, 2000

(30) Foreign Application Priority Data

Feb. 23, 1999  (JP) ............................................. 11-044382

(51) Int. Cl.[7] .......................... G06K 9/36; H04N 11/20
(52) U.S. Cl. ..................... 382/248; 348/403.1; 348/441; 375/240.18; 375/240.2; 382/236
(58) Field of Search .................................. 382/248, 236, 382/239, 251, 250, 233; 348/441, 384.1, 390.1, 403.1, 404.1, 425.1, 426.1; 375/240.2, 240.18, 240

(56) References Cited

U.S. PATENT DOCUMENTS

| 5,537,440 | A | * | 7/1996 | Eyuboglu et al. ............ 375/245 |
| 5,623,312 | A | * | 4/1997 | Yan et al. ................. 375/240.16 |
| 5,629,736 | A | * | 5/1997 | Haskell et al. ............. 348/386.1 |
| 5,764,298 | A | * | 6/1998 | Morrison ...................... 348/500 |
| 5,805,224 | A | * | 9/1998 | Keesman et al. ......... 375/240.04 |
| 5,870,146 | A | * | 2/1999 | Zhu ............................. 375/240.03 |
| 5,940,130 | A | * | 8/1999 | Nilsson et al. ............ 375/240.12 |
| 6,141,447 | A | * | 10/2000 | Linzer et al. ................. 382/236 |
| 6,434,197 | B1 | * | 8/2002 | Wang et al. ............... 375/240.29 |

FOREIGN PATENT DOCUMENTS

JP  9-512410  12/1997

OTHER PUBLICATIONS

Le Gall, D., MPEG: a video compression standard for multimedia applications, Communications of the ACM, Apr. 1991, vol 34, iss 4, p 46–58.*

Amir et al, An application level video gateway, Proceedings of the third ACM international conference on Multimedia, 1995, p 255–265.*

(List continued on next page.)

Primary Examiner—Bhavesh M. Mehta
Assistant Examiner—Christopher Sukhaphadhana
(74) Attorney, Agent, or Firm—Pearne & Gordon LLP

(57) ABSTRACT

An image coding system converting apparatus is arranged by employing input means 102 for sequentially reading an input bit stream, a decoder unit 103 for decoding inputted data, a data buffer 104 for saving either non-compression image data or image data being decoded in a half way, an added information buffer 105 for saving either added information related to image data or added information related to a coding system, an encoder unit 106 for encoding the image data read out from the data buffer 104 with reference to the added information read out from the added information buffer 105, and output means 107 for outputting the image data encoded by the encoder unit 106. Accordingly, it is provided an image coding system converting apparatus, and an image coding system converting method, capable of converting an image coded by one image coding system into another image coding system in a high speed, while suppressing a deterioration of an image quality, and also to provide a recording medium for recording thereon a computer readable program capable of executing the image coding system converting method.

27 Claims, 18 Drawing Sheets

OTHER PUBLICATIONS

Chang et al, Manipulation and compositing of MC–DCT compressed video, IEEE Journal on Selected Areas in Communications, Jan. 1995, vol 13, iss 1, p 1–11.*

Chiariglione, L., The development of an integrated audio-visual coding standard: MPEG, Proceedings of the IEEE, Feb. 1995, vol 83, iss 2, p 151–157.*

Von Roden, T., H.261 and MPEG1—a comparison, Conference Proceedings of the 1996 IEEE Fifteenth Annual International Phoenix Conference on Computers and Communications, Mar. 27–29, 1996, p 65–71.*

Wu et al, An efficient JPEG to MPEG–1 transcoding algorithm, IEEE Transactions on Consumer Electronics, Aug. 1996, vol 42, iss 3, p 447–457.*

Tudor et al, Real–time transcoding of MPEG–2 video bit streams, International Broadcasting Convention 1997, Sep. 12–16, 1997, p 296–301.*

Acharya et al, Compressed domain transcoding of MPEG, Proceedings of the IEEE International Conference on Multimedia Computing and Systems 1998, Jun. 28—Jul. 1, 1998, p 295–304.*

Wee et al, Efficient processing of compressed video, Conference Record of the Thirty–Second Asilomar Conference on Signals, Systems & Computers 1998, Nov. 1–4, 1998, vol 1, p 853–857.*

Kim et al, Transcoding DV into MPEG–2 in the DCT domain, Proceedings of the SPIE, Dec. 1998, vol 3653, p 1026–1032.*

Feamster et al, AN MPEG–2 to H.263 Transcoder, Proceedings of the SPIE, Nov. 1999, vol 3845, p 164–175.*

* cited by examiner

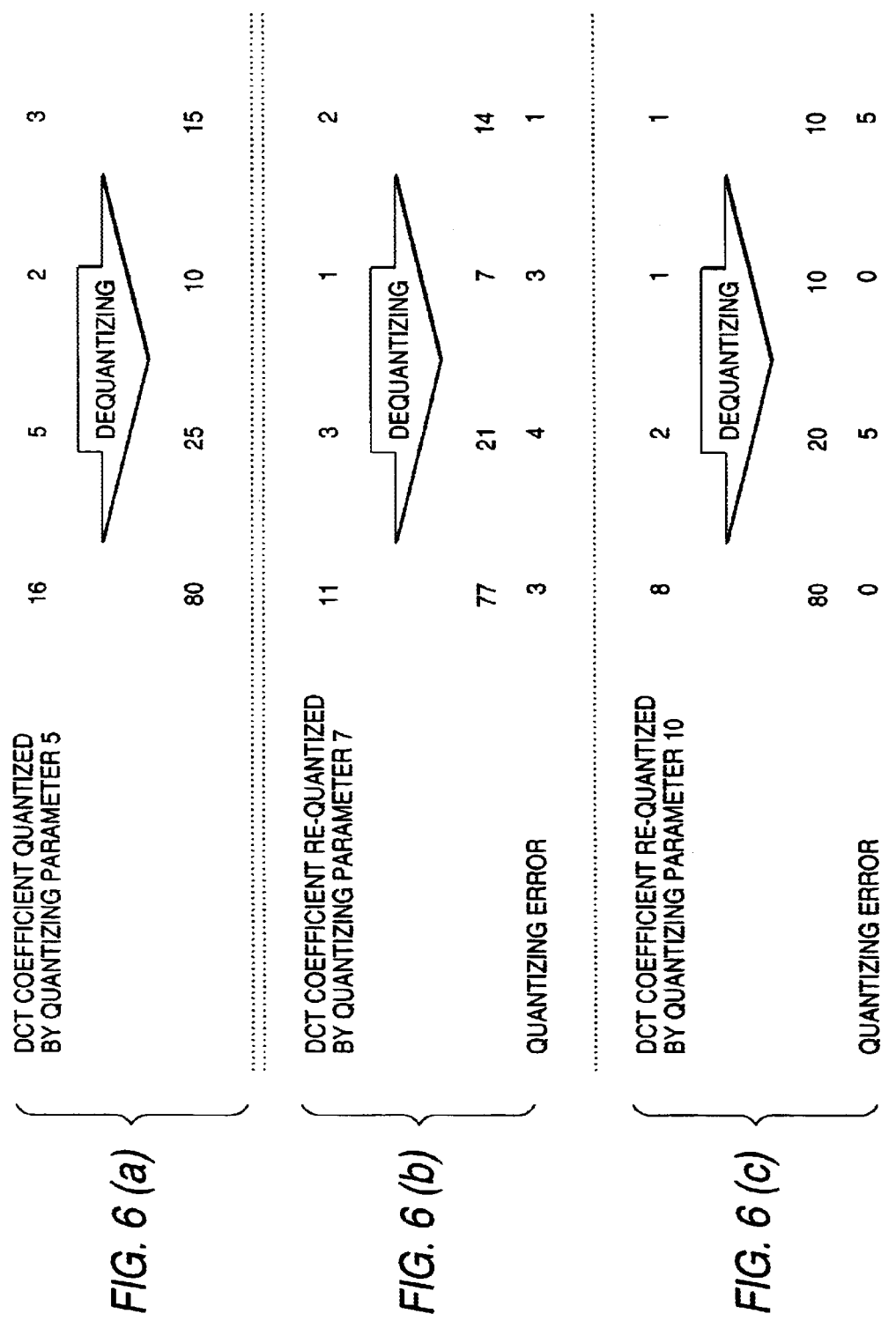

FIG. 7(a)

QUANTIZED DCT BLOCK (run, level) = (0, 13), (0, 5), (0, -7), (0, 6),
(0, 2), (1, 6), (1, 1), (4, -1),
(2, 4), (2, -5), (1, 1), (2, -2),
(13, -1), (2, 2), (3, 1), EOB

⇧ CUT BITS

FIG. 7(b)

CORRECTED DCT BLOCK (run, level) = (0, 13), (0, 5), (0, -7),
(0, 6), (0, 2)(1, 6), (1, 1),
(4, -1), (2, 4), (2, -5), EOB

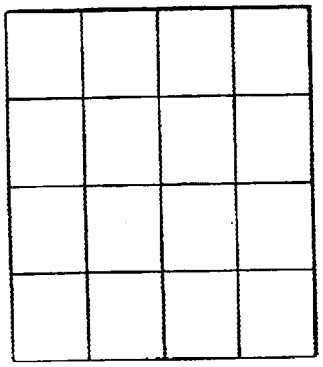
FIG 9(a) QUANTIZED DCT COEFFICIENT → QUANTIZED DCT COEFFICIENT
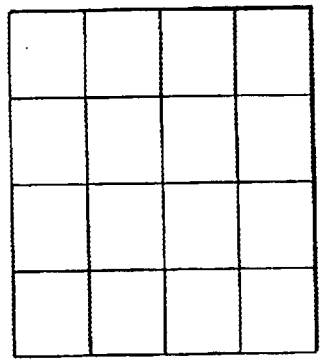
BIT ALLOCATION
- CALCULATE UPPER LIMIT VALUE OF MB FROM picbit_amount
- CALCULATE UPPER LIMIT VALUE OF MB FROM MBbit_amount
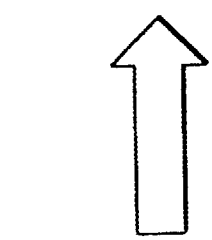
BIT CUT BY VARIABLE LENGTH CODING MEANS BASED ON BIT ALLOCATION MAP
*NO PROCESS OPERATION FOR INTRA MB
FIG 9(b)
| 30 | 25 | 37 | 40 |
| 30 | 25 | 37 | 40 |
| 30 | 25 | 37 | 40 |
| 30 | 25 | 37 | 40 |

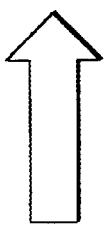

FIG 10(a)

QUANTIZED DCT COEFFICIENT

QUANTIZED DCT COEFFICIENT

QUANTIZED DCT COEFFICIENT IS DIRECTLY USED ONLY INTRA MACROBLOCK

*SINCE IMAGE QUALITY OF INTRA MB IS EFFECTIVE, QUANTIZED DCT COEFFICIENT MAY BE DIRECTLY USED

HOW TO DETERMINE QUANTIZED VALUE OF INTER MB

BASED ON TRANSFORM COEFFICIENCY DUE TO DIFFERENCE IN COMPRESSION RATIOS

EXAMPLE - TRANSFORM COEFFICIENT = 0.7

- USE MULTIPLICATION/DIVISION OF QUANTIZING PARAMETER DEPENDING ON TRANSFORM COEFFICIENT
- WHEN QUANTIZING VALUE IS DETERMINED, QUANTIZING VALUE IS NOT LOWERED FROM ORIGINAL VALUE

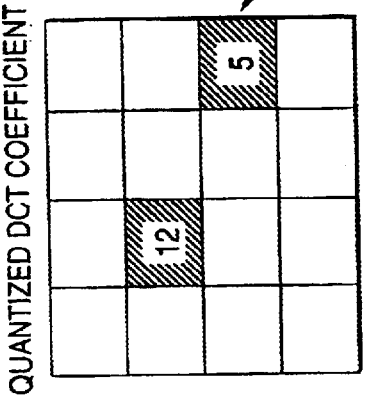
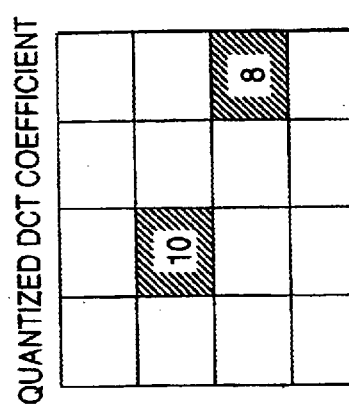
FIG 11(a)
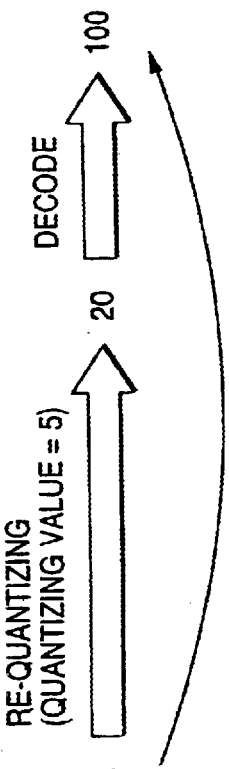
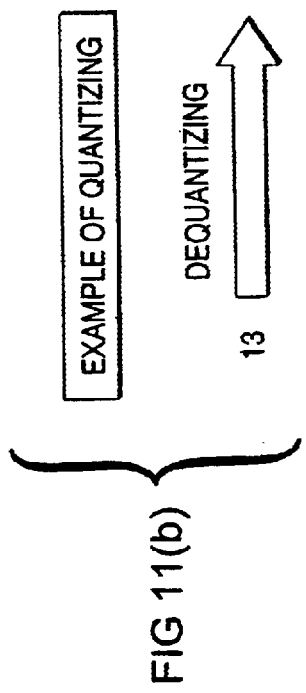
FIG 11(b)

FIG. 12

| H.261 → MPEG4 | | MPEG4 → H.261 | |
|---|---|---|---|
| QUANTIZED VALUE | TRANSFORM COEFFEICIENT | QUANTIZED VALUE | TRANSFORM COEFFEICIENT |
| 2 | 0.8 | 2 | 1.2 |
| 3 | 0.8 | 3 | 1.2 |
| 4 | 0.8 | 4 | 1.1 |
| 5 | 0.7 | 5 | 1.1 |
| 6 | 0.7 | 6 | 1.1 |
| 7 | 0.7 | 7 | 1.1 |
| 8 | 0.9 | 8 | 1.3 |
| 9 | 0.9 | 9 | 1.3 |
| 10 | 0.9 | 10 | 1.3 |
| 11 | 0.9 | 11 | 1.3 |

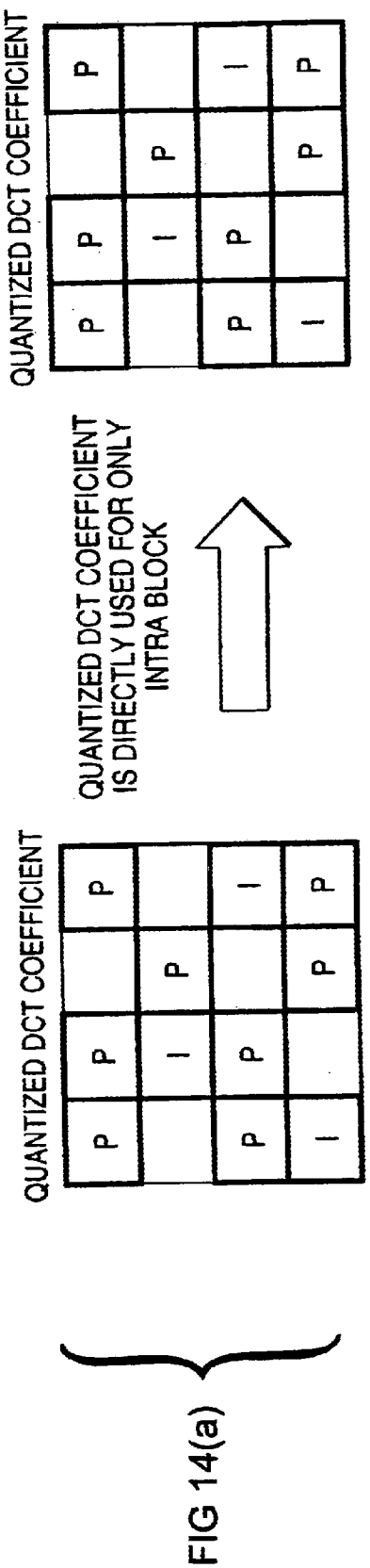

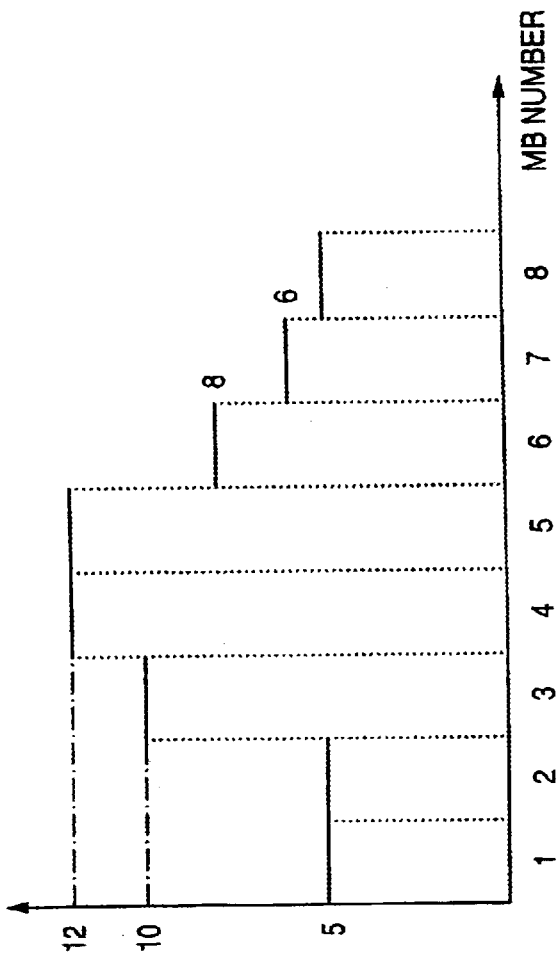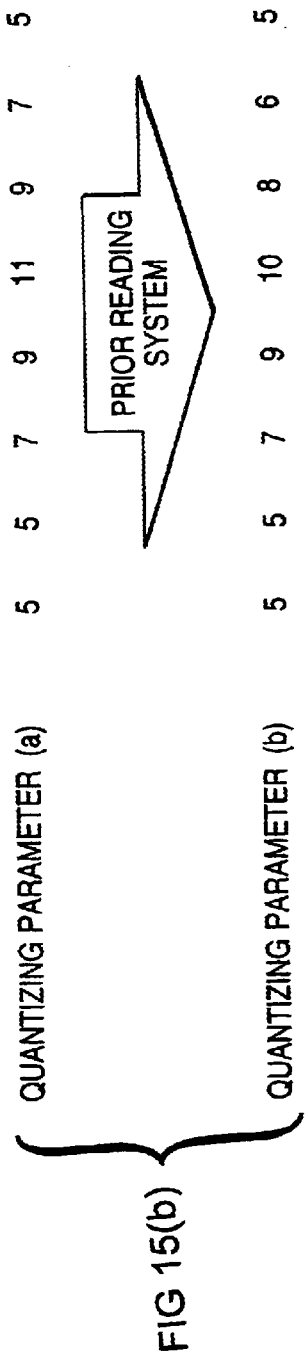

OVERALL ARRANGEMENT DIAGRAM OF CONVENTIONAL CODE CONVERTING APPARATUS

IMAGE CODING SYSTEM CONVERTING APPARATUS, IMAGE CODING SYSTEM CONVERTING METHOD, AND RECORDING MEDIUM

BACKGROUND OF THE INVENTION

The present invention generally relates to an image coding system converting apparatus, an image coding system converting method, and a recording medium for recording a program used to execute this converting method. More specifically, the present invention is directed to such image coding system converting apparatus, image coding system converting method, and recording medium, capable of converting a compression coding system while reducing a necessary calculation amount and suppressing a deterioration of an image quality.

Recently, electronic appliances capable of processing digital picture (image) signals are increased, and the digital picture signals used in these electronic appliances are compressed/coded in accordance with certain coding systems (will be referred to as an "image coding system" hereinafter). There is, however, no compatibility among different image coding systems from each other. Thus, a bit stream coded in one electronic appliance cannot be decoded by such an electronic appliance which performs a coding/decoding operation by using another image coding/decoding system, so that this coded bit stream cannot be reproduced by the latter-mentioned electronic appliance. For instance, when coded picture data which have been stored in a broadcasting station are broadcasted, the following needs may be sometimes made. That is, picture data which has been coded based upon one image coding system different from another image coding system used for the stored picture data is wanted to be decoded for a broadcasting purpose.

To satisfy such a request, the following compressing/coding system is required. That is, a bit stream which has been coded in accordance with a first image coding system is decoded, and this decoded bit stream is again encoded in accordance with a second image coding system. Normally, if the decoder adapted to the first image coding system is combined with the encoder adapted to the second image coding system, then it could realize such a converting apparatus capable of performing the above-explained picture data converting operation.

The major system related to the compressing/coding systems used in the image coding systems for digital picture signals is the hybrid type compressing/coding system. In this hybrid type compressing/coding system, the reduction of the spatial redundancy within the block performed by the DCT (discrete cosine transform) is combined with the reduction of the temporal redundancy between the frames performed by the motion compensation. Furthermore, the data is compressed by employing the entropy coding system. In an actual case, this coding system has been introduced into all of MPEG-1 used in a video CD and a video clip; MPEG-2 used in a DVD and a digital broadcasting system; ITU-T recommendation H.261 used in a television conference/television telephone; ITU-T recommendation H.263 used in a television telephone operable in an analog line; and also MPEG-4 expected as the moving picture coding system for the next generation. In this coding system, DCT, quantizing, motion-compensating, and variable-length coding operations are carried out.

As a result, in the system conversion among these coding systems, the structures of the actual bit streams are resembled to each other. Therefore, while the bit stream coded in accordance with the first image coding system is decoded, the bit amounts every picture and macro-block are counted, so that the process amount required for the bit rate control and the like when the decoded bit stream is coded in accordance with the second image coding system can be reduced.

For example, Japanese Patent Disclosure No. Hei-9-512410 discloses "METHOD FOR CODE-CONVERTING CODED VIDEO SIGNAL AND CODE CONVERTING APPARATUS WITH USING CODE-CONVERTING METHOD THEREOF" so as to reduce the process amount. Now, this code converting apparatus 2000 will be simply explained as prior art with reference to FIG. 17.

FIG. 17 is a block diagram for simply representing the structural arrangement of the code converting apparatus described in Japanese Patent Disclosure No. Hei-9-512410. This code converting apparatus 2000 is arranged by employing the decoding sub-assembly 2001 and the coding sub-assembly 2002. The decoding sub-assembly 2001 contains a demultiplexing circuit 2003 having a function for subdividing the input bit stream into the respective layers, and the normal decoder 2004. Also, the coding sub-assembly 2002 contains the frame memory 2005, the delay circuit 2006, the normal encoder 2007, the bit rate control circuit 2008, the target bit calculator 2009, and the output buffer 2010.

The decoder 2004 decodes the input bit stream which has been decoded, and contains the variable length decoding means, the dequantizing means, the inverse-DCT means, and the like. Also, the encoder 2007 encodes the non-compression image data, and contains the variable length coding means, the quantizing means, the DCT means, the frame memory, the motion compensating means, and the like. Also, both the bit rate control circuit 2008 and the target bit calculator 2009 determine the quantizing steps in the actual coding operation by referring to the bit amount of the output bit stream. It should be noted that the code converting apparatus 2000 is not equipped with a pre-analyzer having a similar circuit arrangement to that of an encoder. This pre-analyzer encodes an input image at a quantizing step preceding to the step for encoding the input image by the encoder.

Next, the operations of the code converting apparatus 2000 will now be simply explained.

The demultiplexing circuit 2003 separates the input bit stream into the coded data and the overhead other than this coded data, for example, the header information and the start code. Both the coded data and the overhead are supplied to the decoder 2004 and the target bit calculator 2009, respectively. In the decoder 2004, the supplied data is decoded, and the non-compression image data is sequentially written into the frame memory 2005. The target bit calculator 2009 counts the bit amount "B" of each of the sub-images such as the macroblocks from both the data and the overhead. Next, the counted bit amounts "B" are added to each other over the entire image so as to acquire the bit amount "S" of one image. Furthermore, the activity "X" of this image is obtained by multiplexing a certain quantizing step "Q2" by the bit amount "S" of one image.

The target bit calculator 2009 contains the memory, and calculates the bit "T" of the present frame based upon the activity "Xpre" of the preceding frame and the obtained activity "X". The target bit "T" is distributed to the local target value "Tn" every macroblock by the distributing circuit provided in the target bit calculator 2009, and then the local target value "Tn" is sent to the bit rate control circuit 2008. The bit rate control circuit 2008 calculates the quantizing step "Q1" to be corrected from the supplied local target value "Tn" and the condition "b" (packing density) of the output buffer 2010, and then supplies the calculated quantizing step Q1 to the quantizing means (not shown) employed in the encoder 2007. After the non-compression image has passed through the delay circuit, this non-compression image is supplied to the encoder 2007 so as to be encoded. At this time, the quantizing means provided in the encoder 2007 quantizes the non-compression image by using the quantizing step Q1. The encoder 2007 sequentially outputs the encoded bit stream to the buffer 2010.

As previously explained, the code converting apparatus 2000 can make the bit rate of the input bit stream equal to the bit rate of the output bit stream, while the pre-analyzer can be omitted, in such a manner that the bit stream is demultiplexed by the demultiplexing circuit 2003 and then the demultiplexed bit streams are entered to the target bit calculator 2009.

However, in the above-described conventional code converting apparatus 2000, when the demultiplexing circuit 2003 demultiplexes the input bit stream up to the macroblock layer, since this demultiplexing circuit 2003 requires the variable length decoding function, there are various problems that the circuit scale is increased and furthermore, the calculation amount is increased. There is another problem that the calculation amount required for performing the decoding operation by the decoder and also the calculation amount required for executing the encoding operation by the encoder are not reduced, as compared with such a case that the decoder is merely connected in series with the encoder. In addition, as indicated in FIG. 18, after such an input bit stream which has been once coded is completely decoded, this decoded input bit stream is again coded. As a result, there is a further problem that the deterioration occurs in the image quality.

SUMMARY OF THE INVENTION

The present invention has been made to solve the problems, and therefore, has an object to provide an image coding system converting apparatus, and an image coding system converting method, capable of converting an image coded by one image coding system into another image coding system in a high speed, while suppressing a deterioration of an image quality, and also to provide a recording medium for recording thereon a computer readable program capable of executing the image coding system converting method.

In the image coding system converting apparatus and the image coding system converting method according to the present invention, the separation means (step) separates the input data into the coded image data and the added information data, this image data is produced by coding a picture in the unit of a block, which owns a plurality of blocks constituted by a predetermined number of pixels, and the added information data contains data amount information of the picture; the decoding means (step) inverse-orthogonal-transforms the coded image data; the allocation means (step) allocates the upper limit data amount to the respective blocks owned by the picture based upon the data amount information of the picture; and the coding means (step) cuts the data of the subject block in such a case that the data amount of the subject block is larger than, or equal to the upper limit data amount set to the subject block, and inverse-orthogonal-transforms the cut data.

In the image coding system converting apparatus and the image coding system converting method of the present invention, the separation means (step) separates the input data into the coded image data and the added information data, this image data is produced by coding a picture in the unit of a block, which owns a plurality of blocks constituted by a predetermined number of pixels, and the added information data contains data amount information of the plurality of blocks; the decoding means (step) inverse-orthogonal-transforms the coded image data; the allocation means (step) sets the upper limit data amount of the respective blocks based upon the data amount information of the picture; and the coding means (step) cuts the data of the subject block in such a case that the data amount of the subject block is larger than, or equal to the upper limit data amount set to the subject block, and inverse-orthogonal-transforms the cut data.

As previously explained, in the decoding means (decoding step), only the inverse-orthogonal-transforming operation is performed while both the dequantizing operation and the inverse DCT transforming operation are not carried out, and in the coding means (coding step), only the orthogonal transforming operation is carried out while both the DCT transforming operation and the quantizing operation are not carried out. As a result, the calculation amount required for converting a certain image coding system into another image coding system can be largely reduced. Accordingly, it is possible to provide the image coding system converting apparatus, the image coding system converting method, and the recording medium, by which the highspeed image coding system converting operation can be realized. Also, since the data of the block is cut based upon the upper limit data amount, even when a certain image coding system is converted into another different image coding system, these image coding systems can be converted at the substantially same bit rate as the original bit rate without giving any large adverse influence to the image quality.

Further, according to the present invention, the separation means (step) separates the input data into the coded image data and the added information data, this image data is produced by coding a picture in the unit of a block, which owns a plurality of blocks constituted by a predetermined number of pixels, and the added information data contains coding information of the each block and quantizing parameter information; the block coding system judging means (step) judges the coding system of the subject block with reference to the coding information of the subject block; the decoding means (step) executes either the inverse-orthogonal-transform operation and the dequantizing operation with respect to the subject block in response to such a judgement result made of the block coding system judging means (step); the coding means (step) includes the quantizing parameter output means (step) for outputting a new quantizing parameter based upon the quantizing parameter information, wherein the first coding means (step) is performed which orthogonal-transforms such a block which has been inverse-orthogonal-transformed by the decoding means (step) without quantizing the block; and the coding means (step) wherein as to such a block which has been inverse-orthogonal-transformed and dequantized by the decoding step, after the new quantizing parameter outputted from the quantizing parameter output means (step) is multiplied by the DCT coefficient of the block, the second coding means (step) quantizes and also orthogonal-transforms the block.

More specifically, the block coding system judging means (step) judges as to whether the subject block corresponds to the intra-coded block, or the inter-coded block; and when the block coding system judging means (step) judges that the subject block corresponds to the intra-coded block, the decoding means (step) inverse-orthogonal-transforms the subject block judged as the intra-coded block, whereas when the block coding system judging means (step) judges that the subject block corresponds to the inter-coded block, the decoding means (step) inverse-orthogonal-transforms and also dequantizes the subject block judged as the inter-coded block.

As described above, since the quantized DCT coefficient is directly used for the intra-coded type block, both the dequantizing calculation required in the decoding means (decoding step), and also the quantizing calculation required in the coding means (coding step) can be omitted. Accordingly, the highspeed image coding system converting operation can be realized. Also, as to the inter-coded type block, the new quantizing parameter is produced by multiplying the new quantizing parameter by the DCT coefficient of this block, and this inter-coded type block is requantized by using this newquantizing parameter. Therefore, even when a certain image coding system is converted into another different image coding system, these image coding systems can be converted at the substantially same bit rate as the original bit rate without giving any large adverse influence to the image quality.

Also, the block coding system judging means (step) judges as to whether the subject block corresponds to the intra-coded block, or the inter-coded block; and when the block coding system judging means (step) judges that the subject block corresponds to the intra-coded block, the decoding means (step) inverse-orthogonal-transforms the subject block judged as the intra-coded block, whereas when the block coding system judging means (step) judges that the subject block corresponds to the inter-coded block, and further judges as to whether the coding system of the block belonging to the frame time-sequentially succeeded to the frame to which the subject block, and located at the same position of the subject block corresponds to the intra-coded block, or the inter-coded block; when the judged block corresponds to the intra-coded block, the decoding means (step) inverse-orthogonal-transforms the subject block judged as the intra-coded block, whereas when the judged block corresponds to the intra-coded block, the decoding means (step) inverse-orthogonal-transforms and also dequantizes the subject block judged as the inter-coded block.

As previously explained, the quantized DCT coefficient is directly employed with respect to both the intra-coded type block, and also such an inter-coded type block that the coded type of the block corresponds to the intra-coded type block, and this block is located at the same position as that of the subject block of such a frame time-sequentially subsequent to the frame to which the subject block belongs. As a result, the dequantizing calculation required in the decoding means (decoding step), and also the quantizing calculation required in the coding means (coding step) can be omitted. Accordingly, the more highspeed image coding system converting operation can be provided. Also, the blocks other than the above-explained block may readily cause the image qualities to be deteriorated while the blocks located at the same positions within the time-sequentially subsequent frame are such inter-coded type blocks. However, these blocks may become the intra-coded type blocks in future. Therefore, it is possible to realize such an image coding type converting operation while suppressing the deterioration in the image qualities. It should also be noted that since a total number of frames to be judged by the above-explained block coding system judging step is reduced, the time duration when the deterioration in the image quality occurs can be shortened.

Also, the added information contains bit amount information of each of the blocks; the block coding system judging means (step) judges as to whether the subject block corresponds to the intra-coded block, or the inter-coded block; and when the block coding system judging means (step) judges that the subject block corresponds to the intra-coded block, the decoding means (step) inverse-orthogonal-transforms the subject block judged as the intra-coded block, whereas when the block coding system judging means (step) judges that the subject block corresponds to the inter-coded block, the decoding means (step) either inverse-orthogonal-transforms or inverse-orthogonal-transforms and also dequantizes the subject block judged as the inter-coded block based upon an activity indicative of a degree of coding difficulty which is acquired by multiplying the bit amount of the subject block by the quantizing parameter.

As previously explained, since the activity is used, the simple calculation can be used to judge that the quantized DCT coefficient can be directly employed to which block among the inter-coded system block. As a result, the highspeed image coding system converting operation can be realized with smaller calculation amounts than those of the prior art.

Also, the transforming-coefficient calculating means (step) calculates the transforming coefficient based upon a difference in compression ratios before/after the image coding systems are converted; and in the quantizing parameter output means (step), when the transforming coefficient calculated by the transforming-coefficient calculating step is larger than 1, the quantizing parameter output means (step) sets the new quantizing parameter as the multiplier indicated by the quantizing parameter information; whereas when the transforming coefficient is smaller than 1, the quantizing parameter output step sets the new quantizing parameter as the divisor indicated by the quantizing parameter information and outputs the new quantizing parameter.

As a consequence, even when a certain image coding system is converted into another different image coding system having a different compression ratio from that of the first-mentioned image coding system, the quantizing error can be reduced. This quantizing error corresponds to a difference between the DCT coefficient dequantized by the original quantizing parameter and the DCT coefficient quantized by the new quantizing parameter. As a result, the image coding system converting operation can be realized while suppressing the deterioration in the image quality caused by the quantizing error related to the quantizing transform.

More specifically, the quantizing parameter output means (step) outputs the original DCT coefficient as the DCT coefficient as the block in such a case that while either the multiplier of the quantizing parameter or the divisor thereof indicated by the quantizing parameter information is used as the new quantizing parameter, the DCT coefficient obtained by multiplying the DCT coefficient of the block by the multiplier, or the divisor becomes smaller than the original DCT coefficient.

When the DCT coefficient obtained by multiplying the new quantizing parameter by the DCT coefficient of the block becomes smaller than the original DCT coefficient, the quantizing error will occur, resulting in the deterioration of the image quality. Therefore, such an image coding system converting operation can be realized while considerably suppressing the image quality deterioration caused by the quantizing errors related to the quantizing transform, in accordance with the above-explained converting apparatus, method, and recording medium.

Also, the transforming coefficient may be preferably equal to such a value obtained by dividing the compression ratio of the coding system before the coding system is converted by the compression ratio of the coding system after the coding system is converted.

Also, the added information data contains the data amount information of the picture; the upper limit data amount calculation means (step) for calculating the upper limit data amount of the picture based upon the data amount information of the picture; and the transforming coefficient may be preferably equal to such a value calculated by the ratio of the data amount indicated by the data amount information of the picture to the upper limit amount of the picture calculated by the upper limit data amount calculating means (step).

Also, the transforming coefficient is equal to a predetermined value which is previously determined in response to the quantizing parameter indicated by the quantizing parameter information every combination between the coding system before being converted and the coding system after being converted.

As previously explained, since the quantizing parameter corresponding to the transform coefficient is previously determined, the highspeed image coding system converting operation with a small calculation load can be realized.

Also, the quantizing parameter output means (step) determines the new quantizing parameter of the subject block based upon the quantizing parameters of a plurality of continuous blocks subsequent to the subject block with respect to the block which is inverse-orthogonal-transformed and dequantized by the decoding step.

As explained above, when the new quantizing parameter of the subject block is determined, the block subsequent to this subject block is prior-read so as to increase/decrease the optimum quantizing parameter. As a result, it is possible to suppress a total number of blocks in which the deterioration in the image quality will occur in connection with the transform of the quantizing parameter.

Furthermore, when both the image coding system converting apparatus and the image coding system converting method output the image data which has been coded in connection with the MPEG-4 standard, the quantizing parameter output means (step) reads the respective quantizing parameters of a plurality of continuous macroblocks with respect to a subject block which is inverse-orthogonal-transformed and dequantized by the decoding means (step) so as to determine a set region of adjoining macroblocks whose quantizing parameters are smaller than a predetermined value; and determines the quantizing parameter of the subject macroblock based upon the quantizing parameters of a plurality of continuous macroblocks subsequent to the subject macroblock within the set region.

In the MPEG-4 standard, there is such a limitation that a difference in the quantizing parameters between the adjoining macroblocks must be selected to be smaller than, or equal to ±2. As a result, when a new quantizing parameter is desirably selected to be larger than, or equal to ±3, such a set area of the adjoining macroblocks is determined, in which the difference in the quantizing parameters is smaller than a preselected value. Thus, the difference in the quantizing parameters among the macroblocks within this set area may be made smaller than, or equal to ±2. Accordingly, such a new quantizing parameter can be determined irrespective of the above-explained limitation. Therefore, it is possible to realize the image coding system converting operation with high flexibility.

Furthermore, a recording medium, according to the present invention, is featured by such a recording medium for recording thereon as a computer readable program, the image coding system converting method as mentioned above.

BRIEF DESCRIPTION OF DRAWINGS

FIGS. 6(*a*), 6(*b*) and 6(*c*) are explanation diagrams for explaining a calculation of a DCT coefficient with employment of a quantizing parameter;

FIGS. 7(*a*) and 7(*b*) are explanation diagrams for explaining a bit cut process operation executed by variable length coding means;

FIGS. 9(*a*) and 9(*b*) are explanatory diagrams for showing a first embodiment of the image coding system converting method according to the first embodiment mode;

FIGS. 10(*a*) and 10(*b*) are explanatory diagrams for indicating a second embodiment of the image coding system converting method according to the first embodiment mode;

FIGS. 11(*a*) and 11(*b*) are explanatory diagrams for explaining an occurrence of a quantizing error and a method for determining a quantizing parameter according to the second embodiment;

FIG. 12 is an explanatory diagram for explaining a conversion table;

FIGS. 14(*a*) and 14(*b*) are explanatory diagrams for representing an image coding system converting method according to the second embodiment mode;

FIGS. 15(*a*) and 15(*b*) are explanatory diagrams for explaining a decision oaf quantizing parameter by way of a prior-reading system of a macroblock;

DESCRIPTION OF THE PREFERRED EMBODIMENTS

Referring now to drawings, an image coding system converting apparatus, an image coding system converting method, and a recording medium, according to the present invention, will be described in detail in this order of [FIRST EMBODIMENT MODE] and [SECOND EMBODIMENT MODE]. It should be understood that both the image coding system converting apparatus and the image coding system converting method, according to the present invention, will be described in detail in the respective explanations of these embodiment modes. However, as to the recording medium according to the present invention, since this recording medium merely records thereon a computer program used to execute the image coding system converting method according to the present invention, a description of this computer program may be involved in the below-mentioned description of this image coding system converting method. It should also be noted that the present invention is not limited to these embodiment modes, but may be modified, changed, and substituted without departing from the technical scope and spirit of the present invention.

The image coding system converting apparatus, according to the present invention, again compresses/codes a moving picture bit stream which has been compressed/coded by way of a certain coding system in accordance with another coding system different from the first-mentioned coding system, and then outputs the compressed/coded moving picture bit stream. As to such a coding system directed to the image coding system converting apparatus and the image coding system converting method, according to the present invention, process operations are carried out, for instance, the orthogonal-transforming operation such as a DCT (discrete cosine transform), the quantizing operation, the variable length coding operation, the motion compensating operation, and the entropy coding operation. As an example of these coding systems, the ITU-T recommendation H.261 and H.263, the MPEG-1, the MPEG-2, the MPEG-4 are conceivable.

First Embodiment Mode

Figure 1:
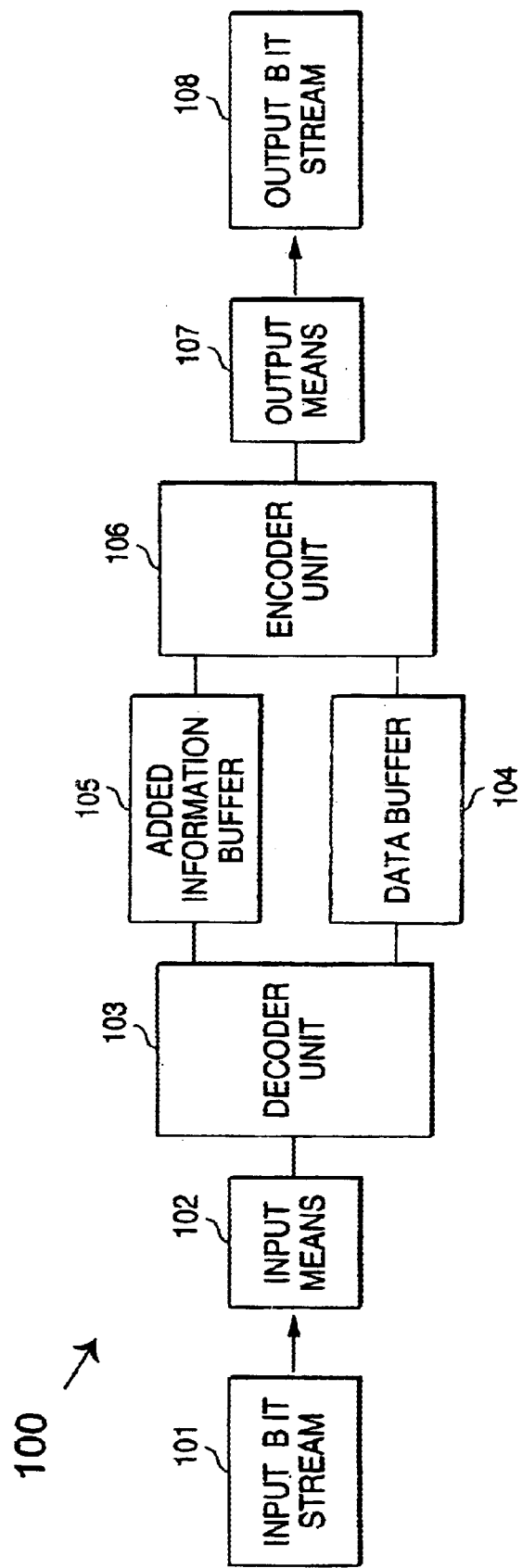
FIG. 1 is a block diagram for showing an arrangement of an image coding system converting apparatus according to a first embodiment mode of the present invention.

FIG. 1 is a block diagram for indicating an arrangement of an image coding system converting apparatus according to a first embodiment mode of the present invention.

In this drawing, the image coding system converting apparatus 100, according to this first embodiment, is arranged by employing input means 102, a decoder unit 103 corresponding to the decoding means defined in the scope of claim for a patent, a data buffer 104, an added information buffer 105, an encoder unit 106 corresponding to the coding means thereof, and output means 107.

First, the input means 102 sequentially reads an input bit stream 101 for 1 frame and stores the read input bit stream 101 into an internal bit buffer (not shown). When the storage content of this bit buffer becomes empty, the input means 102 reads the input bit stream 101 of the next 1 frame and then stores the read input bit stream 101 into this bit buffer.

Also, the decoder unit 103 sequentially receives the necessary data from the bit buffer of the input means 102, and then decodes the entered data. Also, the decode unit 103 saves either non-compression image data or such image data decoded in a half way into the data buffer 104. This non-compression image data has been completely decoded up to YUV (symbol "Y" indicates luminance signal, and symbols "U" and "V" represent color difference signals). Also, the decoder unit 103 saves either added information related to image data or added information related to a coding system into the added information buffer 105.

Also, this data buffer 104 saves thereinto either the non-compression image data or the image data decoded in a half way. Also, the added information buffer 105 saves thereinto either the added information related to the image data or the added information related to the coding system.

Also, the encoder unit 106 encodes, or codes the image data read out from the data buffer 104. At this time, the encoder unit 106 executes the encoding operation in response to the added information which is read out from the added information buffer 105. Also, the encoder unit 106 sequentially saves the coded image data into a bit buffer (not shown) contained by the output means 107.

Furthermore, when the coded data for 1 frame is saved in a bit buffer (not shown) employed inside the output means 107, this output means 107 sequentially outputs this 1-frame coded data as an output bit stream 108.

Figure 2:
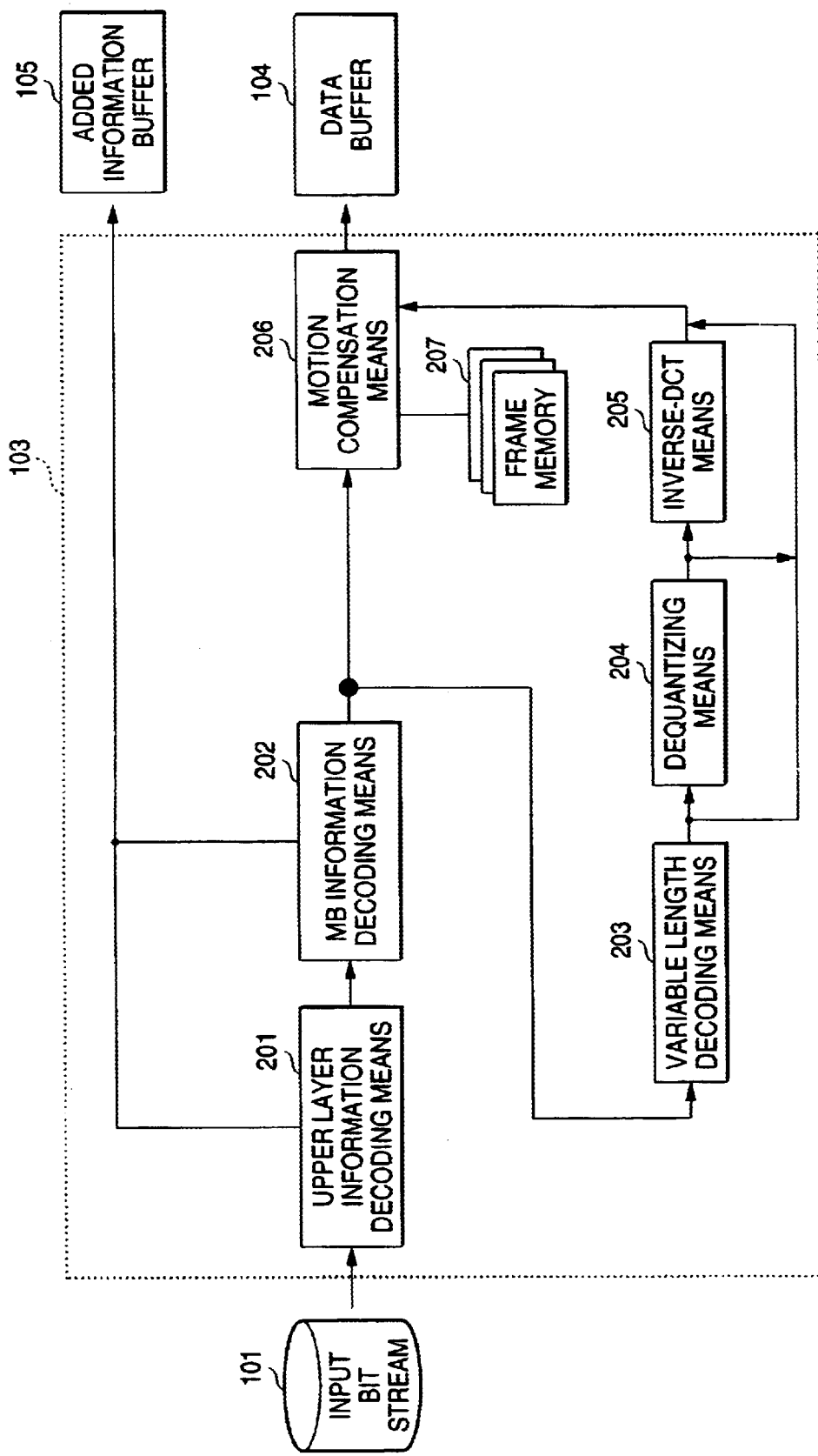
FIG. 2 is a block diagram for representing an internal arrangement of a decoder unit.

Next, an internal arrangement and operation of the decoder unit 103 will now be explained more in detail. First, the internal arrangement of the decoder unit 103 is explained with reference to FIG. 2. FIG. 2 is a schematic block diagram for indicating the internal arrangement of the decoder unit 103. The decoder unit 103 is arranged by employing upper layer information decoding means 201 (corresponding to "separation means" defined in scope of claim for this patent), MB information decoding means 202 (corresponding to "block coding system judging means" thereof), variable length decoding means 203, dequantizing means 204, inverse-DCT means 205, motion compensating means 206, and a frame memory 207.

First, the upper layer information decoding means 201 decodes layer information of such layers higher than, or equal to a picture layer among layers which constitute a moving picture bit stream layer. For example, in the case of MPEG-2, since the moving picture bit stream sequence is constituted by the six layers, namely "sequence layer"; "GOP (Group Of Picture) layer"; "picture layer"; "slice layer"; "macroblock layer", and "block layer" in the order from the uppermost layer, this upper layer information decoding means 201 decodes the information related to both the sequence layer and the GOP layer.

Also, the MB information decoding means 202 decodes the MB information specific to each of macroblocks (MBs). It should be understood that a "macroblock" implies a combination of 2 blocks×2 blocks (also referred to as sub-blocks) as to a luminance signal. One sub-block is constituted by 8×8 pixels, so that one macroblock is constituted by 16×16 pixels.

Also the variable length decoding means 203 variable-length-decodes a variable-length-coded macroblock, the dequantizing means 204 dequantizes the variable-length-decoded macroblock, and also, the inverse-DCT means 205 inverse-DCT-transforms the dequantized macroblock.

More specifically, the dequantizing means 204 selectively dequantizes the variable-decoded-macroblock, depending upon such a fact as to whether a macroblock corresponds to an "intra(I)" type macroblock, or a "inter(P)" type macroblock. Also, the inverse-DCT means 205 selectively inverse-DCT-transforms the dequantized macroblock, depending upon such a fact as to whether a macroblock corresponds to an "intra" type macroblock, or an "inter" type macroblock.

It should also be noted that an "intra(I)" type macroblock corresponds to both a quantized DCT coefficient and a quantizing parameter, which are variable-coded. On the other hand, an "inter(P)" type macroblock corresponds to a quantized DCT coefficient which is variable-coded in combination with a motion vector and also a quantizing parameter in accordance with the below-mentioned manner. That is, a predicted macroblock contained in a frame time-sequentially preceding to a subject frame and containing the smallest error with respect to a subject macroblock. Then, a motion vector indicative of a relative position with respect to this predicted macroblock is detected, and thus, an optimum predicted macroblock is acquired based upon this detected motion vector. A differential macroblock equal to a difference between the subject macroblock and the predicted macroblock corresponding thereto is DCT-transformed, and thereafter, the above-explained quantizing DCT coefficient which is obtained by quantizing the DCT coefficient is variable-length-coded together with both the motion vector and the quantizing parameter. In other words, an intra-macroblock corresponds to such a macroblock which is coded without motion compensation, whereas an inter-macroblock corresponds to such a macroblock which is coded with being motion-compensated (namely, prediction-coded with motion compensation).

Also, the motion compensating means 206 receives such a macroblock which has been variable-length-decoded by the variable length decoding means 203 and also has been quantized/DCT-transformed, and then outputs this received macroblock to the data buffer 104 in the case that the macroblock is the "intra"-macroblock. On the other hand, when the macroblock is the "inter"-macroblock, the motion compensating means 206 receives both a differential macroblock and a motion vector, which have been variable-length-decoded by the variable length decoding means 203, have been dequantized by the dequantizing means 204, and have been inverse-DCT-transformed by the inverse-DCT means 205. Thereafter, this motion compensating means 206 cuts out a predicted macroblock based upon both the received motion vector and the preceding frame which has been previously decoded and stored into the frame memory 207, and then adds the received differential macroblock to this predicted macroblock.

Furthermore, the frame memory 207 temporarily stores the decoded frame, the decoded macroblocks are sequentially stored from the motion compensating means 206 into this frame memory 207.

Figure 3:
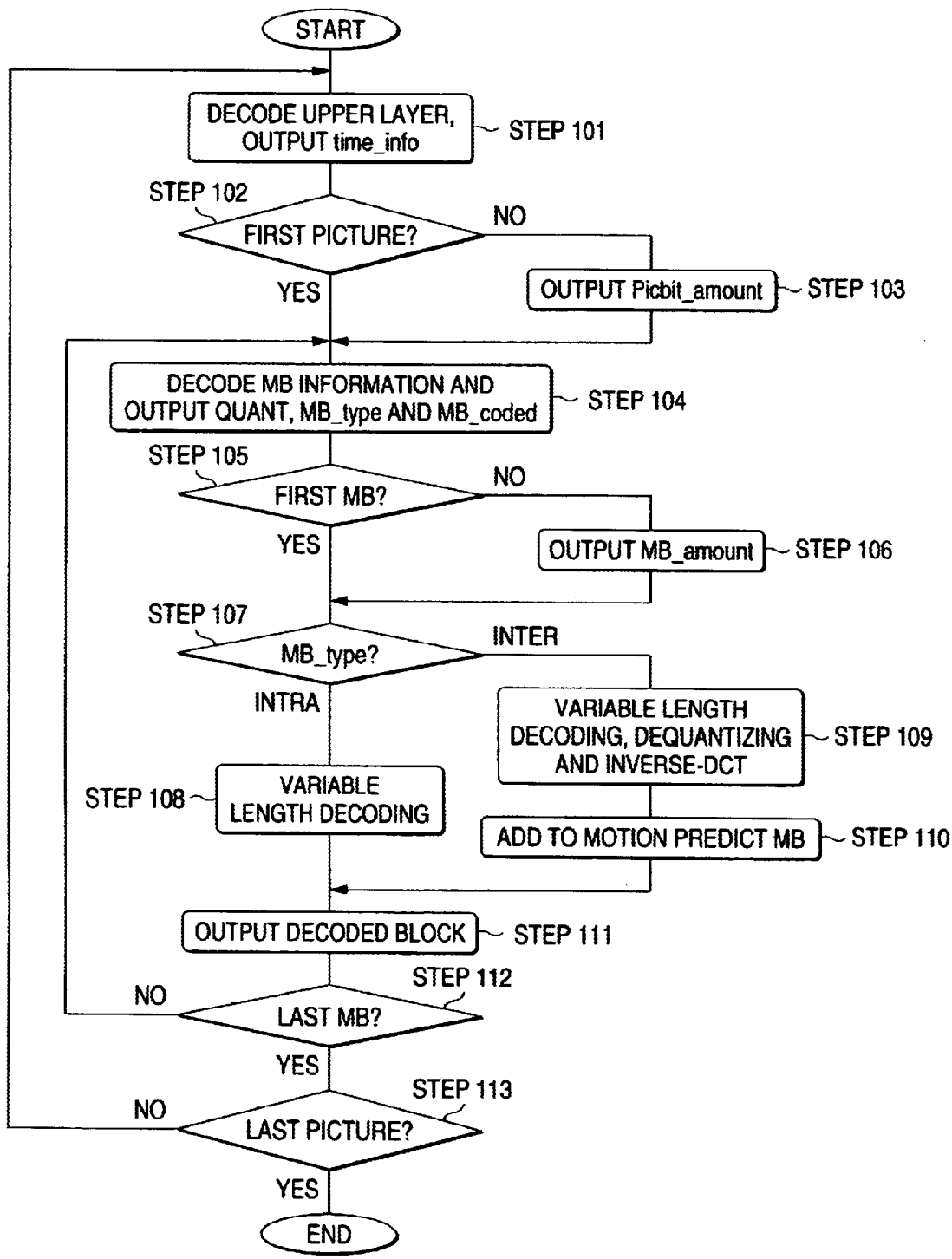
FIG. 3 is a flow chart for describing a decoding process operation executed by the decoder unit.

Referring now to FIG. 3, a description will be made of a decoding process operation, according to this first embodiment mode, executed by the decoder unit 103 containing these structural elements. FIG. 3 is a flow chart for describing the decoding process operation executed by this decoder unit 103. First, at a step S101, the upper layer information decoding means 201 reads out a start code, layer information, and the like of each of these layers, and then decodes time information on which timing is recorded. This timing is used to output a picture contained in a picture layer on a screen. The upper layer information decoding means 201 supplies this decoded time information as "Time-info" to the added information buffer 105.

Next, at a step S102, the upper layer information decoding means 201 judges as to whether or not the picture to be decoded corresponds to a first picture. When this picture is not equal to the first picture, the decoding process operation is advanced to a step S103, whereas when this picture is equal to the first picture, the decoding process operation is advanced to a step S104. At the step S103, the upper layer information recording means 201 supplies a total bit amount as "picbit-amount" to the added information buffer 105. This total bit amount is defined from the start code of the preceding picture up to the start code of the next picture. Then, the decoding process operation is advanced to the step S104.

At this step S104, the MB information decoding means 202 decodes information related to the respective macroblocks; and then supplies the quantizing parameter as "Quant", the type of macroblock such as the "intra" type macroblock or the "inter" type macroblock as "MB-type", and the coded/non-coded information for each block contained in the macroblock as "MB-coded" to the added information buffer 105.

Next, at a step S105, the MB information decoding means 202 judges as to whether or not the macroblock to be decoded corresponds to a first macroblock. When this macroblock is not equal to the first macroblock, the decoding process operation is advanced to a step S106, whereas when this macroblock is equal to the first macroblock, the decoding process operation is advanced to a step S107. At the step S106, the MB information recording means 202 supplies a total bit amount as "MBbit-amount" to the added information buffer 105. This total bit amount is defined from the preceding macroblock up to the next macroblock. Then, the decoding process operation is advanced to the step S107.

At the step S107, the MB information decoding means 202 judges as to whether the macroblock to be decoded corresponds to the "intra" type macroblock, or the "inter" type macroblock. When this macroblock to be decoded corresponds to the "intra" type macroblock, the decoding process operation is advanced to a step S108, whereas when this macroblock to be decoded corresponds to the "inter" type macroblock, the decoding process operation is advanced to a step S109. At the step S108 (in case of intra type macroblock), the variable length decoding means 203 variable-length-decodes this intra type macroblock to thereby obtain a quantized and DCT-transformed macroblock. This resulting macroblock is directly supplied to the motion compensating means 206 without through both the dequatizing means 204 and the inverse-DCT means 205.

On the other hand, at the step S109 (in case of inter type macroblock), the inter type macroblock is variable-length-decoded by the variable length decoding means 203, is dequantized by the dequantizing means 204, and is inverse-DCT-transformed by the inverse-DCT means 205 so as to decode both a differential macroblock and a motion vector. Thus, these differential macroblock and motion vector are supplied from the inverse-DCT means 205 to the motion compensating means 206. Next, at a step S110, the motion compensating means 206 cuts out a predicted macroblock by using both the preceding frame and the preceding motion vector, which have been previously decoded and have been stored into the frame memory 207. Then, the motion compensating means 206 adds the differential macroblock to this predicted macroblock. At this time, when the precision of this cut predicted macroblock is low, an image decoded by employing this predicted macroblock would be deteriorated.

When the decoding process operation defined at either the step S108 or the step Silo, this decoding process operation is advanced to a further step S111, at which the motion compensating means 206 outputs the macroblock which is quantized and DCT-transformed to the data buffer 104 when the macroblock corresponds to the intra type macroblock. When the macroblock is the inter type macroblock, the motion compensating means 206 outputs such a non-compression macroblock which has been produced by adding the differential macroblock to the predicted macroblock to the data buffer 104.

Next, at a step S112, a check is made as to whether or not the decoded macroblock corresponds to the last macroblock. When this decoded macroblock is not equal to the last macroblock, the decoding process operation is returned to the previous step S104 at which the decoding process operation defined after the S104 is carried out with respect to the next macroblock. To the contrary, when this decoded macroblock is equal to the last macroblock, the decoding process operation is advanced to a step S113. At this step S113, a check is made as to whether or not the decoded picture corresponds to the last picture. When this decoded picture is not equal to the last picture, the decoding process operation is returned to the previous step S101 at which the decoding process operation defined after the S101 is carried out with respect to the next picture. To the contrary, when this decoded picture is equal to the last picture, this decoding process operation is completed.

Figure 4:
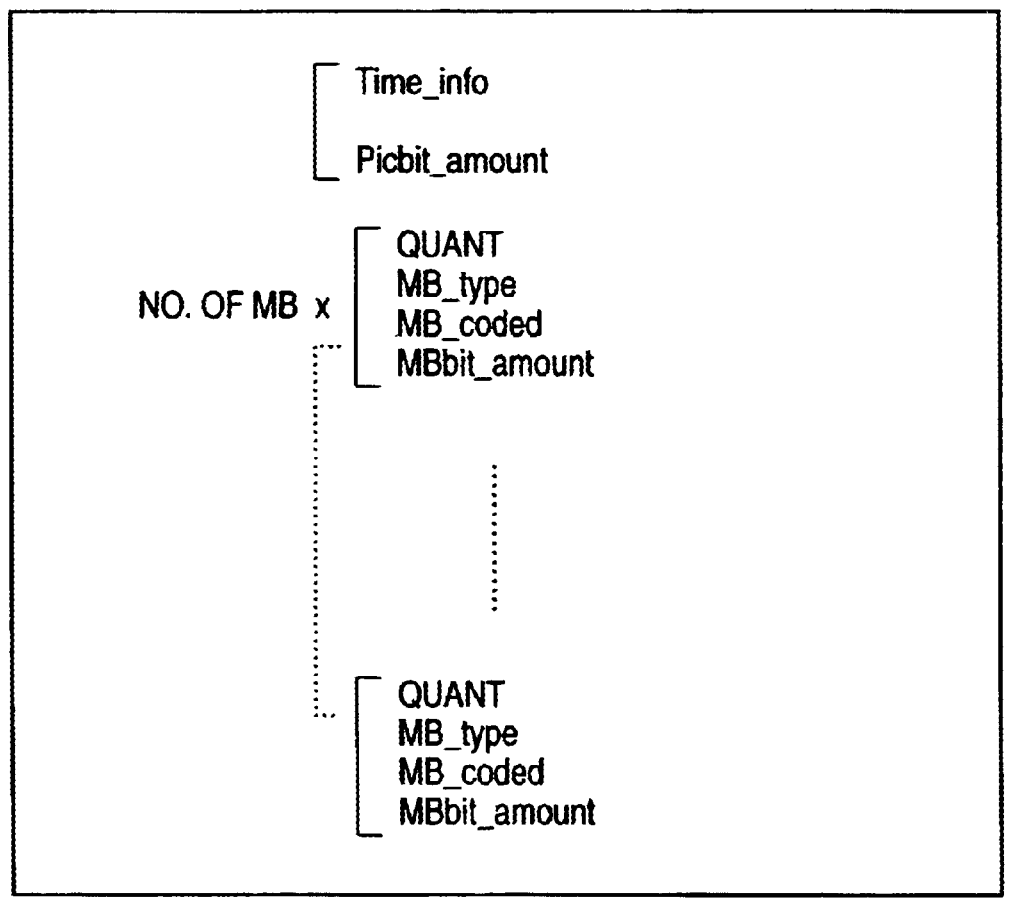
FIG. 4 is an explanatory diagram for explaining a format of data written into an added information buffer.

FIG. 4 represents one format of data written into the added information buffer 105 when one picture is decoded. In this data format shown in FIG. 4, this data contains "Time-infor" corresponding to time information of a certain picture, and "Pictbit-amount" corresponding to a total bit of this picture. Furthermore, while using as one set "Quant" equal to the quantizing parameter; "MB-type" equal to the macroblock type; "MB-coded" equal to the coded/non-coded information of the macroblock; and "MBbit-amount" equal to a total bit of one macrobit, this data contains plural sets of the above-explained information which are equal to a total number of macrobits owned by this picture. It should also be noted that "GOBbit-amount" corresponding to a total bit amount of GOBs (Groups of Blocks), namely a group of macroblocks, and "Blockbit-amount" corresponding to a bit amount for each of blocks may be written into the added information buffer 105. All of the above-explained information will be referred to as "added information".

Figure 5:
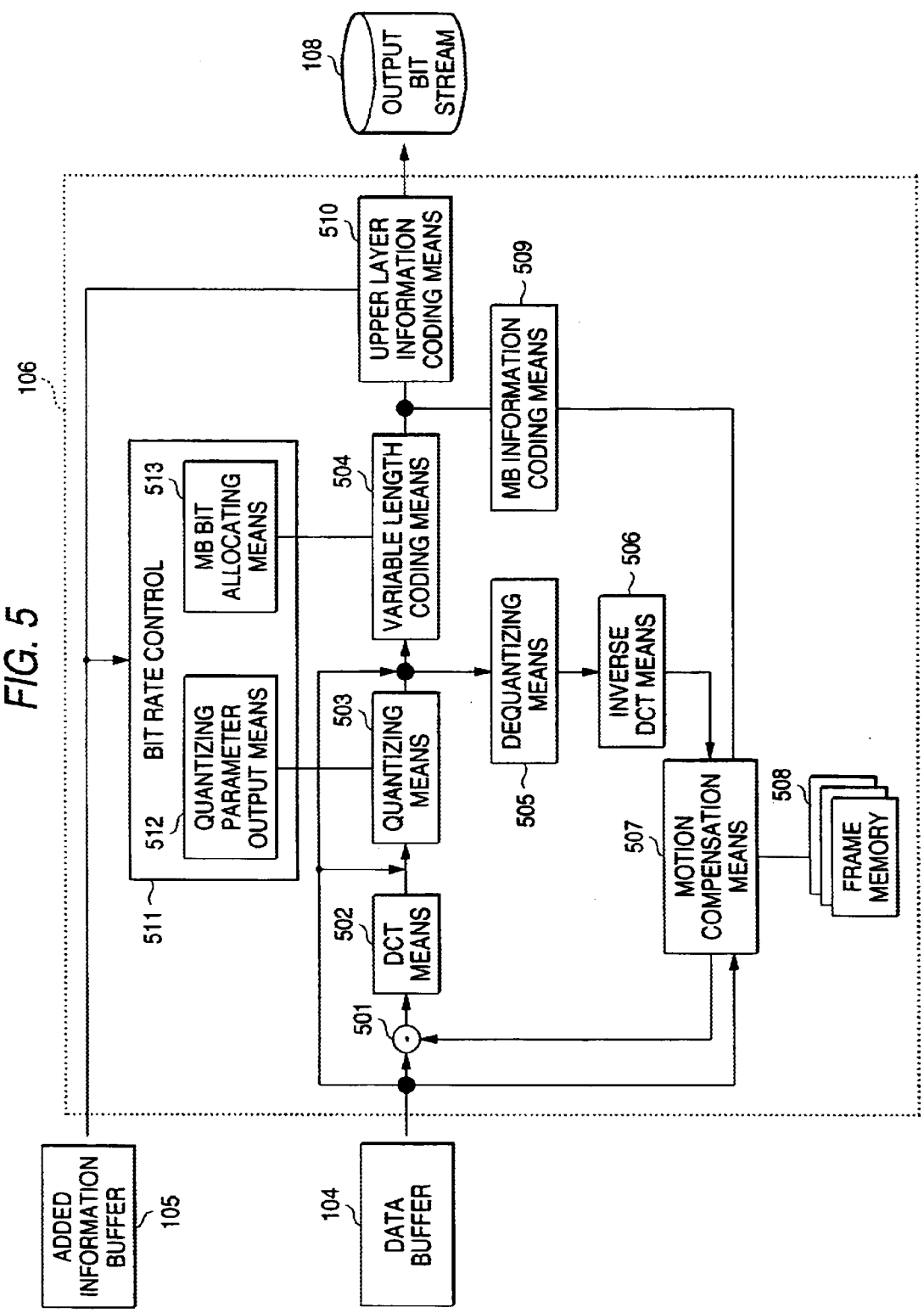
FIG. 5 is a block diagram for showing an internal arrangement of an encoder unit.

Next, an internal arrangement and operation of the encoder unit 106 will now be explained in detail. First, the internal arrangement of the encoder unit 106 is described with reference to FIG. 5. FIG. 5 is a block diagram for schematically indicating the internal arrangement of the encoder unit 106. This encoder unit 106 is arranged by employing a bit rate control unit 511 corresponding to either a transform coefficient calculating means or an upper limit data amount calculating means, a subtracter 501, a DCT means 502, quantizing means 503, a variable length coding means 504, a dequantizing means 505, an inverse DCT means 506, a motion compensating means 507, a frame memory 508, an MB information coding means 509, and an upper layer information coding means 510.

First, the bit rate control unit 511 is to control an adjustment of a bit rate, and contains a quantizing parameter output means 512 and an MB bit allocating means 513 corresponding to an allocation means. Subsequently, the bit rate adjusting method executed in the bit rate control unit 511 will now be explained more in detail. Since both an input bit rate and an output bit rate are coded by way of different image coding systems, normally, the input/output bit streams own different bit rates from each other in order to reproduce the completely same image qualities of these input bit stream and output bit stream. The causes of these different bit rates may be conceived based upon, for instance, a difference in layer structures; a difference in total numbers of information belonging to the same layers; a difference in bit lengths to be allocated even in the same information; a difference in quantizing methods; and a difference in variable length coding methods. However, since such an image coding system converting apparatus and an image coding system converting method are required which can output a bit stream having such a bit rate equal to an input bit stream even when an image coding system is changed, the bit rate control unit 511 is employed so as to absorb a difference in these bit rates.

Also, the bit rate control unit 511 internally employs a register (not shown) capable of temporarily saving added information which is read out from the added information buffer 105, Further, the bit rate control unit 511 separately contains a memory in addition to this registers by which a bit amount of previously-coded picture and a compression ratio between encoders can be saved. A compression ratio corresponds to a bit amount ratio of compression image data to non-compression image data when an image of a constant image quality is coded. Although a compression ratio is varied every sample of an image, an average value which is calculated by way of a statistical manner may be utilized. It should also be understood that a compression ratio may be influenced by a quantizing parameter, and when the quantizing parameter becomes large, the compression ratio is increased.

Also, a compression ratio differs from each other, depending upon a coding system. As a result, when the image coding system converting apparatus according to this first embodiment mode is initialized, both the compression ratio of the image coding system for the input bit stream and the compression ratio of the image coding system for the output bit stream are stored from an external source via an encoder control means (not shown) into the memory of the bit rate control unit 511. This bit rate control unit 511 calculates a transform coefficient required in the image coding system conversion based on these stored compression ratios, and then saves the calculated transform coefficient into the memory.

For instance, when the compression ratio of the ITU-T recommendation H.261 is 1/a and the compression ratio of the MPEG-4 is 1/b, the transform coefficient required in the image coding system conversion from the input bit stream of the recommendation H.261 to the output bit stream of the MPEG-4 becomes b/a. Conversely, the transform coefficient-required in the image coding system conversion from the input bit stream of the MPEG-4 to the output bit stream of the recommendation H.261 becomes a/b.

Now, a description will be made of a first bit rate adjusting method executed by the bit rate control unit 511. The bit rate control unit 511 reads a total bit "Picbit-amount" of 1 picture from the added information buffer 105 before the coding operation of 1 picture is commenced, and calculates a target bit amount based upon this read total bit "Picbit-amount" when this 1 picture is decoded. At this time, this target bit amount is set to be larger than the read total bit "Picbit-amount" in the case that the bit amount of the past picture is smaller than the target bit amount of this picture. Conversely, when the bit amount of the past picture is larger than the target bit amount of this picture, this target bit amount is set to be smaller than the read total bit "Picbit-amount"

Also, the MB bit allocating means 513 employed in the bit ate control unit 511 allocates a target bit amount of a subject picture to each of these macroblocks, and acquires a target bit amount of each of the macroblocks. Next, the MB bit allocating means 513 supplies the target bit amount of each of the macroblocks as an upper limit bit amount of the macroblock to the variable length coding means 504. On the other, the quantizing parameter output means 512 employed in the bit rate control unit 511 reads out the quantizing parameter "Quant" saved in the register, and then multiplies this value by the transform coefficient related to the image coding system transform to obtain a quantizing parameter which will be then supplied to the quantizing means 503.

Next, a description will now be made of a second bit rate adjusting method executed by the bit rate control unit 511.

In this second bit rate adjusting method, when the MB bit allocating means 513 allocates a bit, this MB bit allocating means 513 reads out a total bit "MBbit-amount" of 1 macrobit contained in the added information saved in the register employed in the bit rate control unit 511, and then sets an upper limit bit amount of this 1 macrobit based on this read total bit value while the target bit amount of the picture is not used. Thus, the MB bit allocating means 513 supplies this upper limit bit amount to the variable length coding means 504. On the other hand, the quantizing parameter output means 512 reads out the quantizing parameter "Quant" contained in the added information from the register, and then multiplies this quantizing parameter by the transform coefficient related to the image coding system transform.

Subsequently, a description will now be made of another quantizing parameter determining method executed by the quantizing parameter output means 512. In FIG. 6(a), there are shown a DCT coefficient "A" obtained by quantizing an input bit stream, and a dequantizing DCT coefficient "B" obtained by dequantizing this DCT coefficient "A". For example, in such a case that the quantizing parameter is equal to 5 and the quantized DCT coefficients "A" are equal to [16, 5, 2, 3] from the left side, the dequantized DCT coefficients "B" are equal to [80, 25, 10, 15] (B=A×5) from the left side. When this DCT coefficient "B" is quantized by the quantizing parameter 5, the quantizing error becomes 0. However, as previously explained, the bit rate is changed, due to the difference between the compression ratios of the coding systems.

As a consequence, as indicated in FIG. 6(b), the transform coefficient related to the image coding system transform is multiplied by the previously explained quantizing parameter so as to determine a quantizing parameter which is requantized. In this case, assuming now that the transform coefficient is equal to 1.4, since the quantizing parameter to be requantized becomes 7(=5×1.4), if the DCT coefficient "B" [80, 25, 10, 15] is again quantized, or requantized by using this quantizing parameter 7, a DCT coefficient "C" [11, 3, 1, 2] (C=B/7). However, while the DCT coefficient becomes small, if the DCT coefficient "C" is dequantized, then the dequantized DCT coefficient "D" becomes [77, 21, 7, 14] (D=C×7). As a result, a quantizing error x (=B−D) such as [3, 4, 3, 1] would be produced.

To the contrary, as shown in FIG. 6(c), while using a multiplier of the original quantizing parameter 5, for instance, twice value thereof, namely 10 is employed as the quantizing parameter for requantizing operation, when the DCT coefficient "B" [80, 25, 10, 15] is again quantized, then a DCT coefficient "E" becomes [8, 2, 1, 1] (E=B/10). When this DCT coefficient "E" is dequantized, a dequantized DCT coefficient "F" becomes [80, 20, 10, 10] (F=E×10) and a quantizing error "Y" becomes [0, 5, 0, 5] (Y=B−F). As previously explained, when the quantizing parameter is equal to 10, the quantized DCT coefficient (E) becomes small, and furthermore the accumulated value of the quantizing errors becomes "10", namely small, as compared with the previous case that when the quantizing parameter is equal to 7, the accumulated value of the quantizing errors becomes 11 (see FIG. 6(b)).

As explained above, there are some possibilities that the quantizing error may be influenced by the value of the DCT coefficient. However, when the transform coefficient is larger than 1, such a quantizing parameter (10) which corresponds to the multiplication of the original quantizing parameter (5) can increase the coefficient (0) of the quantizing error, as compared with the quantizing parameter (7) obtained by being multiplied by the transform coefficient. As a consequence, when the transform coefficient is larger than 1, if the multiplication of the original quantizing parameter is equal to the actual quantizing value, then the accumulated value of the quantizing errors can be reduced. To the contrary, when the transform coefficient is smaller than 1, since the divisor of the original quantizing parameter is used as the actual quantizing value, the coefficient "0" of the quantizing error can be increased. Accordingly, the accumulated value of the quantizing errors can be reduced.

When the macroblock is the inter type macroblock, the subtracter 501 calculates a subtraction between the predicted macroblock obtained from the motion compensating means 507 and the macroblock read out from the data buffer 104 so as to produce a differential macroblock. Also, the DCT means 502 DCT-transforms the differential macroblock obtained from the subtracter 501. The quantizing means 503 quantizes the DCT-transformed differential macroblock based upon the quantizing parameter obtained from the quantizing parameter output means 512 employed in the bit rate control unit 511.

Also, the variable length coding means 504 variable-length-codes such a macroblock which has been DCT-transformed and quantized/is quantized with reference to the upper limit bit amount obtained from the MS bit allocating means 513 employed in the bit rate control unit 511. It should be noted that when the bit amount of the variable-length-coded macroblock exceeds the upper limit bit amount, the variable length coding means 504 performs the variable length coding operation after the DCT coefficient of the rear half block portion (high frequency component) of the macroblock is replaced by "0" so as to cut the bit.

Referring now to FIG. 7, the bit cut process operation by the variable length coding means 504 will now be explained more in detail. FIG. 7 represents an example of the variable length coding operation employed in the ITU-T recommendation H.261 and the like. More specifically, FIG. 7(a) shows a quantized DCT block, and FIG. 7(b) indicates a DCT block obtained after the bit cut process operation has been carried out. First, as indicated by an arrow, the DCT block is variable-length-coded in such a manner that the DCT coefficients are scanned in the zig-zag manner from the upper left DCT coefficient to the lower right DCT coefficient and then these zig-zag scanned DCT coefficients are rearranged to form a one-dimensional coefficient series. When the zig-zag-scanning operation is performed with respect to the DCT blocks, one-dimensional data obtained when the DCT coefficients are rearranged in one dimensional manner corresponds to a combination between a quantity "run" and a value "level" of DCT coefficients (except for 0) to be scanned. The quantity "run" indicates such a fact that how many DCT coefficients of "0" are continuously located in front of the DCT coefficients to be scanned. A symbol "EOB (End Of Block)" is added as a scanning stop code, subsequent to the last non-zero DCT coefficient. It should be noted that in the MPEG-4, a three-dimensional variable coding operation is carried out while using another code "last" in addition to the above-described codes "run" and "level". This new code "last" indicates as to whether or not the DCT coefficient is equal to the last non-zero DCT coefficient among this DCT block.

Upon receipt of the target bit amount of the macroblock from the MB bit allocating means 513 owned in the bit rate control unit 511, the variable length coding means 504 divides this received target bit amount by a total number of blocks contained in one macroblock so as to calculate a target bit amount per 1 block. Next the DCT blocks are scanned in the zig-zag manner by the variable length coding means 504 so as to variable-length-code the DCT coefficients. At the same time, this variable length coding means 504 counts the coding bits. When the coding bit amount becomes equal to the target bit amount of the block, or exceeds over this target bit amount, the variable length coding operation is ended to add the code "EOB". Otherwise, in the case of MPEG-4, the code "last" is set to 1.

For instance, while the DCT block shown in FIG. 7(a) is variable-length-coded, when the coding bit amount is reached to the target bit amount at the place where the value of the DCT coefficient is equal to "−5", as indicated in FIG. 7(b), all of the DCT coefficients subsequent to the DCT coefficient of "−5" may obtain the similar result to that obtained when all of the DCT block having zero values are coded. As explained above, since the variable length coding means 504 cut the bit by using the target bit amount of the macroblock during the variable length coding operation, the coding operation can be carried out at the same bit rate as that of the input bit stream.

Also, the dequantizing means 505 dequantizes the macroblock, and the inverse-DCT means 506 inverse-DCT-transforms the macroblock dequantized by the inverse-quantizing means 505. Also, the frame memory 508 sequentially stores thereinto the dequantized/inverse-DCT-transformed macroblocks to be stored as the frame. These macroblocks are sent to the motion compensating means 507.

Then, the motion compensating means 507 predicts motion in response to the type of the macroblock supplied from the inverse DCT means 506 in order to compensate for the motion. Concrete speaking, in such a case that the macroblock sent from the inverse DCT means 506 corresponds to the inter type macroblock, the motion compensating means 507 predicts the motion of the subject macroblock to detect the motion vector, and acquires a predicted macroblock from a picture of one-preceding frame stored in the frame memory 508 based upon this detected motion vector. After this predicted macroblock has been acquired, the motion compensating means 507 sends this predicted macroblock to the subtracter 501. On the other hand, this motion compensating means 507 adds the differential macroblock to the predicted macroblock, and thereafter, writes the added macroblock into the memory position of the present macroblock saved in the frame memory 508. Also, when the macroblock sent from the inverse DCT means 506 is the intra type macroblock, the motion compensating means 507 writes the dequantized/inverse-DCT-transformed macroblock into the memory position of the present macroblock saved in the frame memory 508.

Also, the MB information coding means 509 codes the information specific to each of the macroblocks, for example, the type of macroblock and the motion vector with respect to the macroblock coded by the variable length coding means 504, and then sends the coded information to the upper layer information coding means 510.

Also, the upper layer information coding means 510 reads out the time information "Time-info" from the added information buffer 105, and codes the layer information of the layer higher than, or equal to the picture layer among the layers for constituting the motion picture bit stream sequence with respect to the coded information which is supplied from the MB information coding means 509.

Figure 8:
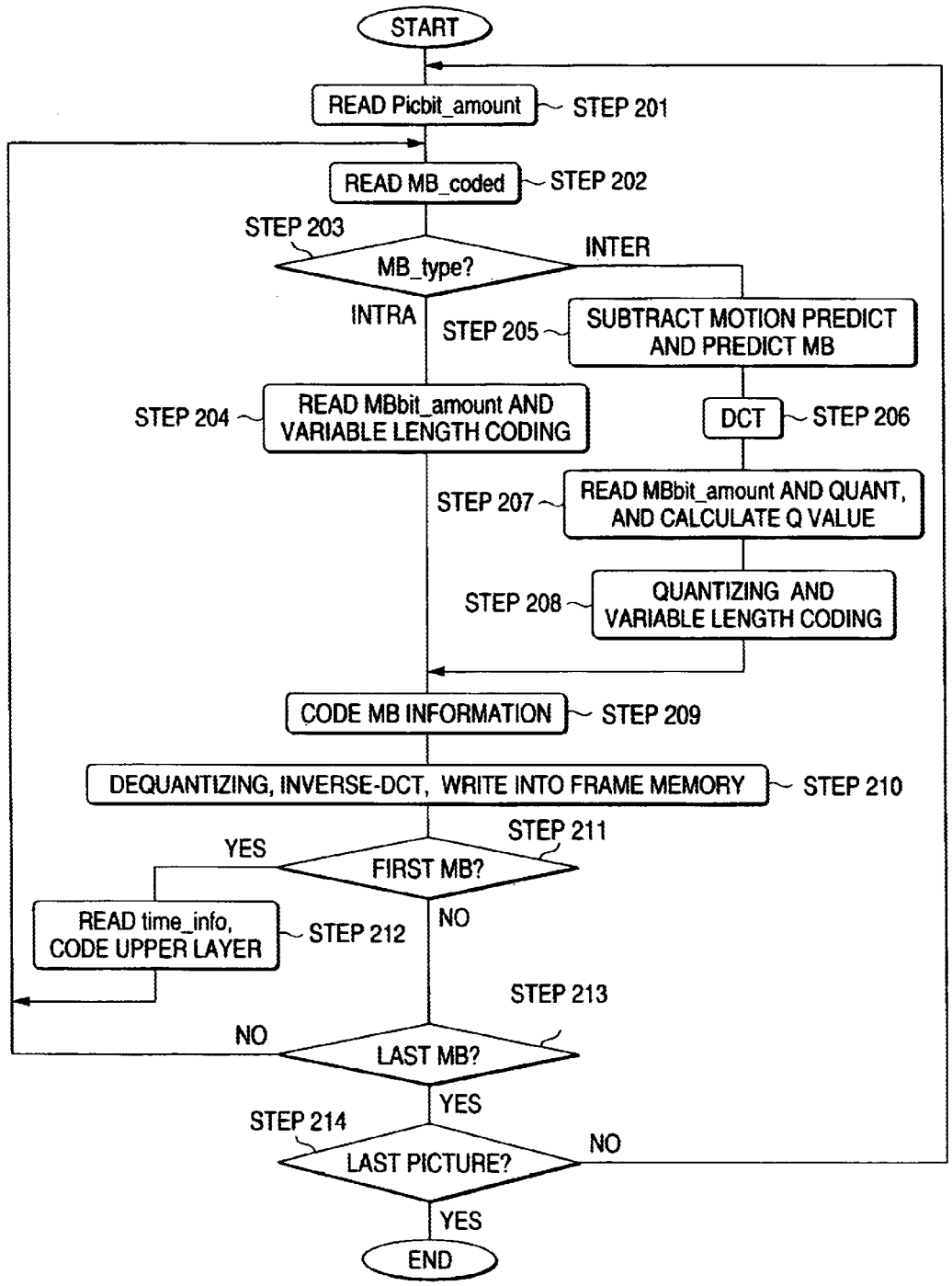
FIG. 8 is a flow chart for explaining an encoding process operation performed by the encoder unit.

Next, referring now to FIG. 8, an explanation will be made of the coding (encoding) process operation, according to this first embodiment mode, executed by the encoder unit 106 having these structural elements. FIG. 8 is a flow chart for describing the coding process operation executed by the encoder unit 106. At a first step S201, the bit rate control unit 511 reads out "Picbit-amount" from the added information buffer 105, and then saves this bit amount to the internal register thereof (not shown). At the next step S202, the encoder control means (not shown) reads out "MB-coded" from the added information buffer 105, and then sends the coded information of the respective blocks of the macroblock to the MB information coding means 509. Now, when no coding process operation is required for all of the blocks, the data stored at the position of the present macroblock of 1-preceding frame is copied from the frame memory 508 to the storage position of the present macroblock within the frame memory 508.

Next, at a step S203, the encoder control means reads "MB-type" from the added information buffer 105, and checks as to whether the type of macroblock corresponds to the "intra" type macroblock or the "inter" type macroblock. When this macroblock corresponds to the intra type macroblock, this decoding process is advanced to a step S204, whereas when this macroblock corresponds to the inter type macroblock, this decoding process is advanced to a step S205. At the step S204 (intra type macroblock), the bit rate control unit 511 reads out "MBbit-amount" from the added information buffer 105, and then saves this bit amount to the internal register (not shown). At this time, the MB bit allocating means 513 provided in the bit rate control unit 511 calculates an upper limit bit amount to be allocated to the present macroblock based upon "Picbit-amount", "MBbit-amount", and the present coding bit amount, and the like, and then sends this upper limit bit amount to the variable length coding means 504. The variable length coding means 504 variable-length-codes the macroblock read from the data buffer 104. At this time, when the bit amount of the variable-length-coded macroblock exceeds this calculated upper limit bit amount, the variable length coding means 504 replaces the DCT coefficient of the rear half block portion (high frequency component) of the macroblock by "0" so as to cut the bits, and thereafter variable-length-codes the cut macroblock.

On the other hand, at the step S205 (inter type macroblock), the motion compensating means 507 detects the motion vector by predicting the motion of the macroblock read from the data buffer 104, and thereafter acquires the predicted macroblock based upon this motion vector, and then supplies this acquired predicted macroblock to the subtracter 501. The subtracter 501 calculates a difference between the predicted macroblock supplied thereto and the macroblock read out from the data buffer 104 by the encoder control means so as to obtain a differential macroblock, and then sends the calculated differential macroblock to the DCT means 502.

Next, at a step S206, the DCT means 502 DCT-transforms the differential macroblock, and then supplies the DCT-transformed differential macroblock to the quantizing means 503. Next, at a step S207, the bit rate control unit 511 reads out both "MB-bit amount" and "Quant" from the added information buffer 105 to save these read information into the internal register (not shown). Subsequently, the quantizing parameter output means 512 employed in the bit rate control unit 511 determines the quantizing parameter of the present macroblock based upon "Picbit-amount", "MBbit-amount", and the present coding bit amount.

Next, at a step S208, the quantizing means 503 quantizes the DCT coefficient by using the quantizing parameter determined by the quantizing parameter output means 512. Next, the variable length coding means 504 variable-length-codes the macroblock quantized by the quantizing means 503. At this time, when the coded bit amount of the variable-length-coded differential macroblock exceeds this calculated upper limit bit amount, the variable length coding means 504 replaces the DCT coefficient of the rear half block portion (high frequency component) of the macroblock by "0" so as to cut the bits, and thereafter variable-length-codes the cut macroblock.

When the process operation defined at the step S204, or the step S208 is completed, the decoding process operation is advanced to a step S209. At this step S209, the MB information coding means 509 adds the MB information such as the type of macroblock and the motion vector to the differential macroblock coded by the variable coding means 504, and then supplies the MB information-added differential macroblock to the upper layer information coding means 510.

Next, at a step S210, the macroblock which has been DCT-transformed and quantized is dequantized by the dequantizing means 505 and is inverse-DCT-transformed by the inverse DCT means 506, and thereafter, the resulting macroblock is sent to the motion compensating means 507. Next, when the supplied macroblock corresponds to the intra type macroblock, the motion compensating means 507 writes such a macroblock which is dequantized and inverse-DCT-transformed into the position of the present macroblock within the frame memory 508. On the other hand, when the supplied macroblock corresponds to the inter type macroblock, the motion compensating means 507 reads out the predicted macroblock from the picture of 1-preceding frame stored in the frame memory 508, and then adds the differential macroblock to this predicted macroblock thereafter, this motion compensating means 507 writes the added macroblock into the position of the present macroblock within the frame memory 508.

Next, at a step S211, a check is made as to whether or not the present macroblock corresponds to a first macroblock within the picture. When the present macroblock is equal to the first macroblock, the coding process operation is advanced to a step S212. When the present macroblock is not equal to the first macroblock and a last macroblock, the coding process operation is advanced to a step S213. At the step S212, the upper layer information coding means 510 reads out "Time-info" from the added information buffer 105, and adds the upper layer information to the bit stream of the macroblock supplied from the MB information coding means 509, and then outputs the bit stream added with the upper layer information to the output means 107. This upper layer information is time information indicative of the start codes of the respective layers and the decoding timing of the picture. Thereafter, the coding process operation is returned to the previous step S202 at which the coding process operation is carried out for the next macroblock.

At the step S213, a check is made as to whether or not the present macroblock corresponds to the last macroblock within the picture. When the present macroblock is not equal to the last macroblock, the upper layer information coding means 510 directly supplies the bit stream of the macroblock sent from the MB information coding means 509 to the output means 107. Then, the coding process operation is returned to the step S202. To the contrary, when the present macroblock is equal to the last macroblock, the coding process operation is advanced to a step S214. At this step S214, a check is done as to whether or not the present frame corresponds to the last picture. When the present frame is not equal to the last picture, the upper layer information coding means 510 directly supplies the bit stream of the macroblock sent from the MB information coding means 509 to the output means 107. Then, the coding process operation is returned to the step S201. To the contrary, when the present frame is equal to the last picture, the coding process operation is accomplished.

As previously explained in detail, in accordance with the image coding system converting apparatus and the image coding system converting method of this first embodiment mode, while the decoder unit 103 performs the decoding operation, the added information containing the macroblock type "MB-type" is written into the added information buffer 105. In the case that the encoder unit 106 encodes such a frame that the intra type macroblocks are mixed with the inter type macroblocks, the motion compensating means 507 judges as to whether the macroblock corresponds to the intra type macroblock, or the inter type macroblock with reference to the macroblock type "MB-type" contained in the added information read from the added information buffer 105. As a result, when the macroblock corresponds to the intra type macroblock, in the encoder unit 106, both the DCT process operation and the quantizing process operation can be omitted. Also, both the dequantizing process operation and the inverse DCT process operation can be omitted in the decoder unit 103.

As a consequence, there is completely no deterioration in the image quality, or the deterioration in the image quality can be suppressed to the minimum value, as compared with the coding/decoding operations executed only for the image data. Also, since the calculation load related to the image coding system converting operation (for example, calculation required to adjust coded bit rate) can be reduced, it is possible to convert the image coding systems in a high speed.

Furthermore, as to the intra type macroblock, since the quantizing parameters equal to each other in the input bit stream and the output bit stream are employed, the image quality of the input bit stream can be completely reproduced under such a condition that there is no quantizing error in the encoder unit 106.

Also, when the inverse DCT transforming operation is not carried out, the data saved in the data buffer 104 corresponds to the non-compression image data. Then, since this non-compression image data is motion-compensated by the encoder unit 106, the image quality of the subject macroblock is better. To the contrary, when the inverse DCT transforming operation is carried out, the data saved in the data buffer 104 is the DCT coefficient of the differential macroblock. This differential macroblock is not motion-compensated by the encoder unit 106, but the same motion vector is also employed. At this time, when the predicted macroblock acquired in the encoder unit 106 is completely identical to the subject macroblock, the image quality of the subject macroblock is not completely deteriorated. If not, then the image quality is more or less deteriorated.

Next, a description will now be made of, in particular, an embodiment related to the operation of the encoder unit 106 employed in the image coding system converting apparatus according to this first embodiment mode.

(First Embodiment)

In a first embodiment, as shown in FIG. 9(a), the encoder unit 106 does not perform both the DCT transforming operation and the quantizing operation irrespective to a type of a macroblock. When the variable-length-coding operation is carried out, the variable length coding means 504 cuts a bit of a macroblock based upon such a bit allocation map as shown in FIG. 9(b). This bit allocation map is formed by using the upper limit bit amounts of the respective macroblocks obtained from the MB bit allocating means 513. It should be understood in this embodiment that as to an intra type macroblock, the upper limit bit amount having the same value for the inter type macroblock is allocated, or while no such an upper limit bit amount is set, the bit cut operation is not completely carried out.

In this first embodiment, neither the quantizing operation, nor the DCT transforming operation are completely carried out as to both the intra type macroblock and the inter type macroblock in the stage for converting the image coding systems. As a result, the calculation amount can be largely reduced and also the image coding systems can be converted in a high speed.

(Second Embodiment)

Then, as shown in FIG. 10(a), in a second embodiment, a quantized DCT coefficient is directly used to an intra type macroblock, whereas as to an inter type macroblock, as previously explained, in the quantizing parameter output means 512, either the divisor of the original quantizing parameter or the multiplication of this original quantizing parameter is used as the actual quantizing value in response to the transform coefficient caused by a difference in the compression ratios.

However, as shown in FIG. 10(b), there are some possibilities that such a quantizing value becomes smaller than the original quantizing parameter. This quantizing value is obtained by calculating such a quantizing value by way of the round-up numbering method, which may becomes a mixed decimal obtained by multiplexing the original quantizing parameter by this transform coefficient. For instance, as indicated in FIG. 11(b), when the DCT coefficient 13 after the original quantizing operation is dequantized by using the quantizing parameter 8, this DCT coefficient becomes 104. When this DCT coefficient is requantized by using the quantizing parameter 5, the requantized DCT coefficient becomes 20. When this DCT coefficient is again dequantized, the resulting DCT coefficient becomes 100.

AS previously explained, when the DCT coefficient which is requantized by using the different quantizing parameters is decreased (namely, from 104 to 100), the image quality would be deteriorated. As a result, as to the DCT coefficient of the macroblock to which such a case is applied, as indicated in FIG. 11(a), the original DCT coefficient is kept remained. When the DCT coefficient is increased by being requantized, the obtained DCT coefficient may be directly employed.

The transform coefficient may be, as explained above, determined based upon the ratio of the compression ratio of the image coding system for the input bit stream to that of the image coding system for the output bit stream. Alternatively, this transform coefficient may be determined every picture by using a ratio of the target bit to the total bit "Picbit-amount" of 1 picture read out from the added information buffer 105.

As shown in FIG. 12, while such a conversion table is previously formed, the transform coefficient may be determined based upon this conversion table. In this conversion table, the original quantizing parameters and the transform coefficients are made in correspondence with each other every converting type from the input bit stream to the output bit stream, for instance, H.261 to MPEG-4 and MPEG-4 to H.261.

In this second embodiment, neither the quantizing operation, nor the DCT transforming operation are completely carried out as to the intra type macroblock in the stage for converting the image coding systems. As a result, the calculation amount can be largely reduced. It should also be noted that since either the quantizing operation or both the quantizing operation and the DCT operation are carried out as to the inter type macroblock, the system converting operation can be carried out in a high speed while suppressing the deterioration in the image quality.

Second Embodiment Mode

Figure 13:
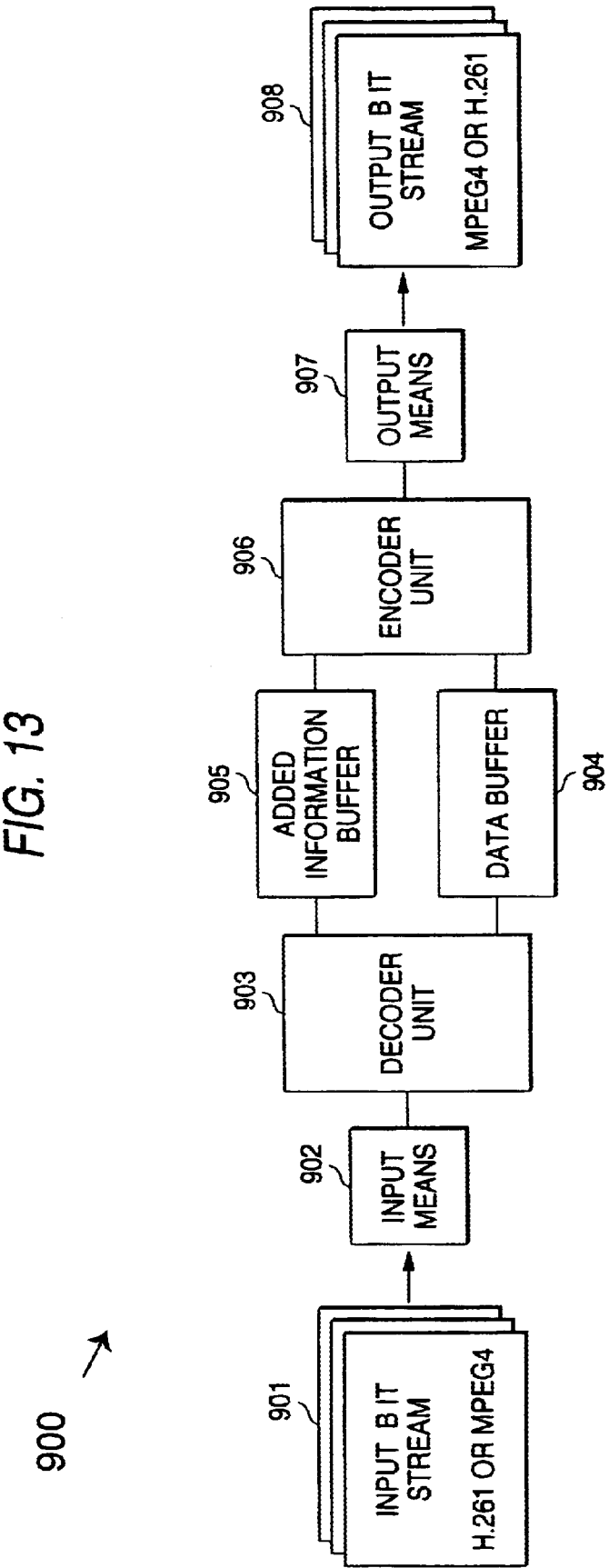
FIG. 13 is a block diagram for indicating an arrangement of an image coding system converting apparatus according to a second embodiment mode of the present invention.

FIG. 13 is a block diagram for schematically indicating an arrangement of an image coding system converting apparatus according to a second embodiment mode of the present invention. It should be understood that the same reference numerals shown in FIG. 1 (namely, first embodiment mode) will be employed as those for denoting the same, or similar means of this second embodiment mode indicated in FIG. 13. In FIG. 13, an image coding system converting apparatus 900, according to this second embodiment mode, is arranged by employing input means 902, a decoder unit 903, a data buffer 904, an added information buffer 905, an encoder unit 906, and output means 907, which outputs coded data for plural frames as output bit streams 908, similar to that of the first embodiment mode.

First, different from the input means 102 of the first embodiment mode, the input means 902 of this second embodiment mode can store input bit streams 901 for plural frames into an internal bit buffer thereof (not shown). The decoder unit 903 can decode the input bit streams for several frames prior to the encoding process operation by the encoder unit 906, and can store either the decoded image data or the data decoded in a half way into the data buffer 904, and also can store the added information into the added information buffer 905.

Also, a data storage capacity of the data buffer 904 and a data storage capacity of the added information buffer 905 are several times larger than those of the data buffer 104 and the added information buffer 105 according to the first embodiment mode. Furthermore, the encoder unit 906 executes the encoding operation by referring to both added information of a subject frame saved in the added information buffer 905, and added information of a backward (future) frame which is time-sequentially located subsequent to the added information of this subject frame.

Next, a description will now be made of an encoding operation executed by the encoder unit 905 in such a case that the image coding system converting apparatus 900 of this second embodiment mode converts coding systems from either MPEG-4 or ITU-T recommendation H.261 to either the ITU-T recommendation H.261 or the MPEG-4. Generally speaking, since the compression ratio of the MPEG-4 is higher than that of the ITU-T recommendation H.261, the transform coefficient used in the image coding system converting operation from the MPEG-4 to the recommendation H.261 becomes larger than 1. At this time, in accordance with the first embodiment mode, the bit allocation is carried out with reference to the upper limit bit value (see FIG. 9, namely first embodiment), the actual quantizing parameter of the inter type macroblock is made by multiplying the original quantizing parameter by 2 (see. FIG. 10, namely second embodiment), or the quantizing parameter is changed by using the conversion table (see FIG. 12, namely second embodiment). As a consequence, the errors would be uniformly distributed to the entire frame.

Therefore, in accordance with this second embodiment mode, when an actual quantizing parameter of a subject macroblock is determined, as indicated in FIG. 14(a), the quantized DCT coefficient is directly used to both an intra type macroblock and the below-mentioned macroblock (corresponding to an empty macroblock shown in FIG. 14(a)) by referring to a type of such a macroblock located at the same position of the subject macroblock of the time-sequentially backward (future) frame. This is, this empty macroblock is an inter type macroblock in a preselected number of frames, but will become an intra type macroblock after several frames (will be referred to "macroblock is refreshed" hereinafter). On the other hand, the quantizing parameter is changed with respect to such an inter type macroblock which is not refreshed.

Also, as a method for determining a macroblock used to change a quantizing parameter, in addition to the above-explained method for previously reading the future frame, an activity indicative of a difficulty degree of coding operation may be obtained by multiplying a code bit amount of a macroblock by a quantizing parameter as shown in FIG. 14(b). Then, the macroblock determining method may be employed based upon the acquired activity. Also, when such an algorithm is employed in which since a macroblock whose activity is large is a fine image, this fine image may be more, or less deteriorated, the quantized DCT coefficient may be directly used with respect to this macroblock, whereas the quantizing parameter may be changed with respect to another macroblock whose activity is small.

It should be noted that as to an inter type macroblock to be refreshed, the quantized DCT coefficient may be directly used, or may not be used, while the quantizing parameter may be used as the same value parameter. When such a transform coefficient is directly used which is multiplied with the quantizing parameter of the inter type macroblock to be refreshed, the bit rate of the output bit stream becomes excessively high, so that the transform coefficient must be adjusted in accordance with a total number of macroblocks whose quantizing parameters are changed.

Next, a description will now be made of encoding operation executed by the encoder unit 906 in such a case that the image coding system converting apparatus 900 according to this second embodiment mode converts the coding system from the recommendation H.261 to the MPEG-4. In this recommendation H.261, a value defined from 1 to 31 may be freely used as the quantizing parameter of the macroblock. However, in the MPEG-4, there is such a limitation that the quantizing parameter between the adjoining macroblocks must be smaller than, or equal to ±2. As a consequence, the quantizing parameter utilized in the macroblock of the recommendation H.261 cannot be directly used. For instance, in such a case that the quantizing parameter 5 is employed in a certain macroblock of the recommendation H.261 and also the quantizing parameter 10 is employed in another macroblock located adjacent to this macroblock, when the image coding system converting apparatus 900 converts the coding system from the recommendation H.261 to the MPEG-4, the quantizing parameter of the adjoining macroblock cannot be increased up to 7.

A graphic representation shown in FIG. 15(a) represents an example of a quantizing parameter used in the ITU-T recommendation H.261. An abscissa shows a macroblock number (MB) number, and an ordinate indicates the employed quantizing parameter. The quantizing parameter is given as [5, 5, 10, 12, 12, 8, 6, 5] in this order. Also, FIG. 15(b) shows an example of a quantizing parameter employed when a coding operation is carried out in the MPEG-4. It is now assumed that the macroblock having the MB number shown in the drawing corresponds to either an intra type macroblock or an inter type macroblock to be refreshed, and thus, changing of the quantizing parameter is not required.

As previously explained, the MPEG-4 owns such a limitation that the quantizing parameter between the adjoining macroblocks must be smaller than, or equal to ±2. As a consequence, when the quantizing parameter is adjusted in accordance with the below-mentioned algorithm, the adjusted quantizing parameter (a) is given as [5, 5, 7, 9, 11, 9, 7, 5]. In this algorithm, when the quantizing parameter is increased, the quantizing parameter is increased by either 1 or 2, whereas when the quantizing parameter is decreased, the quantizing parameter is decreased by either 1 or 2.

To the contrary, when the quantizing parameter is prior-read, it is known such a fact that the quantizing parameter is decreased by the MB numbers 6, 7, 8. Assuming now that while the quantizing parameter is not increased up to 11, but up to 10, the quantizing parameter (b) is given as [5, 5, 7, 9, 10, 8, 6, 5], as to the quantizing parameter (a), a total number of MB numbers different from the quantizing parameter which is employed in the recommendation H.261 becomes 5 (namely MB numbers of 3, 4, 5, 6, 7), whereas as to the quantizing parameter (b), a total number of MB numbers becomes 3 (namely MB numbers of 3, 4, 5). As explained above, the number of such macroblocks in which the image qualities are deteriorated can be suppressed in such a manner that the quantizing parameter of the macroblock is prior-read so as to increase/decrease the optimum quantizing parameter.

Figure 16:
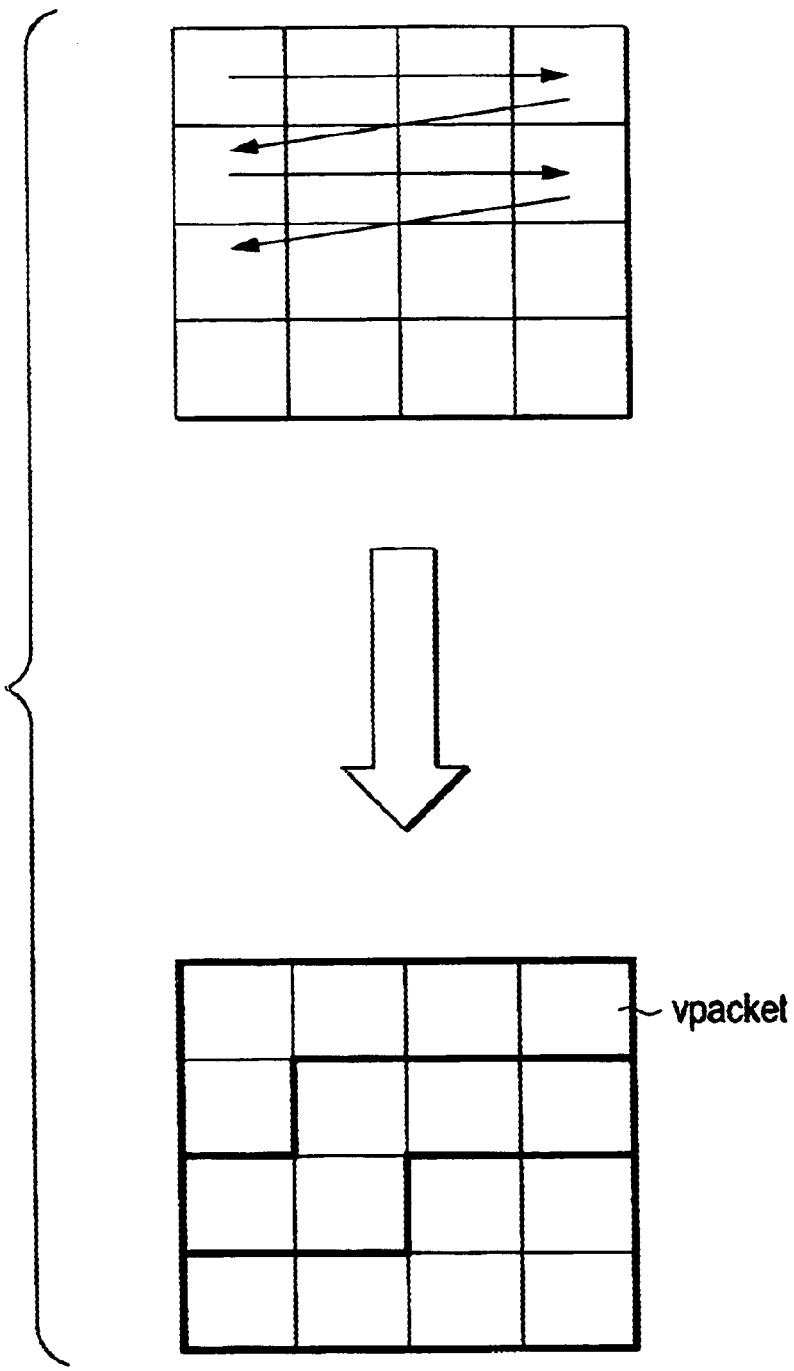
FIG. 16 is an explanatory diagram for indicating a production of a "vpacket" and one example thereof.
Figure 17:
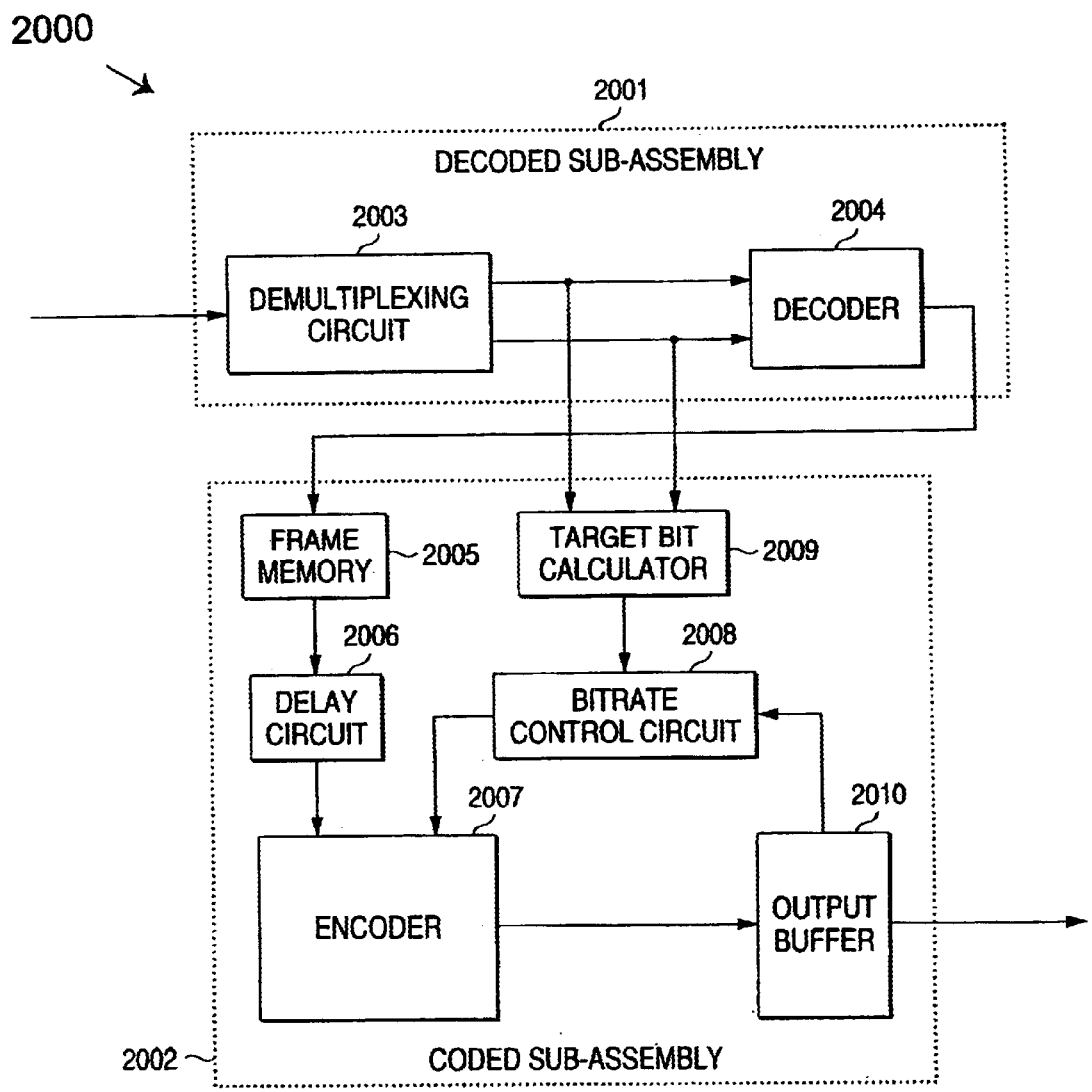
FIG. 17 is a block diagram for simply indicating the arrangement of the code converting apparatus described in Japanese Patent Disclosure No. Hei-9-512410.
Figure 18:
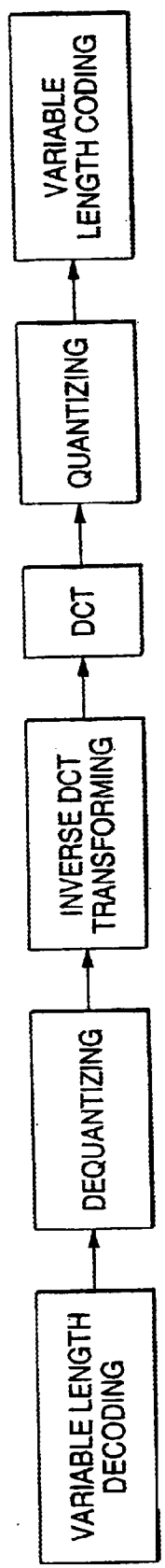
FIG. 18 is an explanatory diagram for explaining the process flow operation of the conventional coding system converting method.

Next, a description will now be made of another encoding operation executed by the encoder unit 906 in such a case that the image coding system converting apparatus 900 according to this second embodiment mode converts the coding system from the recommendation H.261 to the MPEG-4. As previously explained, in the MPEG-4, there is such a limitation that the difference contained in the quantizing parameters between the adjoining macroblocks must be smaller than, or equal to ±2. When a new quantizing parameter is wanted to be increased larger than, or equal to ±3, the below-mentioned "vpacket" system is employed. This "vpacket" system is illustrated in FIG. 16. That is, while macroblocks contained in a frame are sequentially scanned from an upper left corner to a right direction, a plurality of areas are formed within 1 frame by using two sets of continuous macroblocks whose quantizing parameters are largely made different from each other. Thus, these areas are recognized as "vpacket". As a consequence, a "vpacket" is constituted by at least one macroblock, and macroblock which constitute one vpacket are not dispersed.

In the example of FIG. 15, the quantizing parameter is adjusted by prior-reading the macroblocks. However, since such a vpacket is utilized, the macroblock is no longer prior-read. Accordingly, the calculating process amount required for prior-reading the macroblock can be reduced in the example of FIG. 16. Also, since the quantizing parameter is not changed, the quantizing error can be reduced.

It should be noted that the non-linear quantizing operation is carried out with respect to the DC (direct current) coefficient in the blocks within the intra type macroblock in the MPEG-4. As a result, the same quantizing parameters cannot be employed as to the DC coefficient of the intra type block in the recommendation H.261 and the MPEG-4. As a consequence, the DC coefficient is required to be dequantized by the dequantizing means employed in the decoder unit 903, and also the DC coefficient is required to be quantized by the quantizing means provided in the encoder unit 906.

As previously explained, in accordance with the image coding system converting apparatus and the image coding system converting method of this second embodiment mode, the quantized DCT coefficient is directly used for the inter type macroblock to be refreshed with reference to the added information of the subject frame, and the added information of the backward (future) frame from this subject frame. As a result, although the image quality of this inter type macroblock is deteriorated during several frames, the calculation amount related to the image coding system converting operation can be reduced.

Also, even when the image coding system is converted from H.261 to MPEG-4, the quantizing parameter can be changed by prior-reading the macroblocks in order to reduce the quantizing error. Furthermore, since the "vpacket" is employed, the quantizing parameter can be directly employed with respect to such a macroblock that the quantizing parameter need not be changed without any limitation specific to the MPEG-4. As a consequence, the image coding system can be converted while suppressing the deterioration in the image quality.

As previously described in detail, in the image coding system converting apparatus, the image coding system, and the recording medium, according to the present invention, it is featured by that the separation means (step) separates the input data into the coded image data and the added information data, this image data is produced by coding a picture in the unit of a block, which owns a plurality of blocks constituted by a predetermined number of pixels, and the added information data contains data amount information of the picture; the decoding means (step) inverse-orthogonal-transforms the coded image data; the allocation means (step) allocates the upper limit data amount to the respective blocks owned by the picture based upon the data amount information of the picture, or sets the upper limit data amount of the respective blocks based upon the data amount information of the picture; and the coding means (step) cuts the data of the subject block in such a case that the data amount of the subject block is larger than, or equal to the upper limit data amount set to the subject block, and inverse-orthogonal-transforms the cut data.

As previously explained, in the decoding means (decoding step), only the inverse-orthogonal-transforming operation is performed while both the dequantizing operation and the inverse DCT transforming operation are not carried out, and in the coding means (coding step), only the orthogonal transforming operation is carried out while both the DCT transforming operation and the quantizing operation are not carried out. As a result, the calculation amount required for converting a certain image coding system into another image coding system can be largely reduced. Accordingly, it is possible to provide the image coding system converting apparatus, the image coding system converting method, and the recording medium, by which the highspeed image coding system converting operation can be realized. Also, since the data of the block is cut based upon the upper limit data amount, even when a certain image coding system is converted into another different image coding system, these image coding systems can be converted at the substantially same bit rate as the original bit rate without giving any large adverse influence to the image quality.

Also, in the image coding system converting apparatus, the image coding system converting method, and the recording medium, according to the present invention, it is featured by that the separation means (step) separates the input data into the coded image data and the added information data, this image data is produced by coding a picture in the unit of a block, which owns a plurality of blocks constituted by a predetermined number of pixels, and the added information data contains coding information of each block and quantizing parameter information; the block coding system judging means (step) judges the coding system of the subject block with reference to the coding information of the subject block; the decoding means (step) executes either the inverse-orthogonal-transform operation and the dequantizing operation with respect to the subject block in response to such a judgement result made of the block coding system judging means (step); the coding means (step) includes the quantizing parameter output means (step) for outputting a new quantizing parameter based upon the quantizing parameter information, wherein the first coding means (step) is performed which orthogonal-transforms such a block which has been inverse-orthogonal-transformed by the decoding means (step) without quantizing the block; and the coding means (step) wherein as to such a block which has been inverse-orthogonal-transformed and dequantized by the decoding step, after the new quantizing parameter outputted from the quantizing parameter output means (step) is multiplied by the DCT coefficient of the block, the second coding means (step) quantizes and also orthogonal-transforms the block.

More specifically, the block coding system judging means (step) judges as to whether the subject block corresponds to the intra-coded block, or the inter-coded block; and when the block coding system judging means (step) judges that the subject block corresponds to the intra-coded block, the decoding means (step) inverse-orthogonal-transforms the subject block judged as the intra-coded block, whereas when the block coding system judging means (step) judges that the subject block corresponds to the inter-coded block, the decoding means (step) inverse-orthogonal-transforms and also dequantizes the subject block judged as the inter-coded block.

As described above, since the quantized DCT coefficient is directly used for the intra-coded type block, both the dequantizing calculation required in the decoding means (decoding step), and also the quantizing calculation required in the coding means (coding step) can be omitted. Accordingly, it is possible to provide the image coding system converting apparatus, the image coding system converting method, and the recording medium, by which the highspeed image coding system converting operation can be realized. Also, as to the inter-coded type block, the new quantizing parameter is produced by multiplying the new quantizing parameter by the DCT coefficient of this block, and this inter-coded type block is requantized by using this new quantizing parameter. Therefore, even when a certain image coding system is converted into another different image coding system, these image coding systems can be converted at the substantially same bit rate as the original bit rate without giving any large adverse influence to the image quality.

Also, more specifically, the block coding system judging means (step) judges as to whether the subject block corresponds to the intra-coded block, or the inter-coded block; and when the block coding system judging means (step) judges that the subject block corresponds to the intra-coded block, the decoding means (step) inverse-orthogonal-transforms the subject block judged as the intra-coded block, whereas when the block coding system judging means (step) judges that the subject block corresponds to the inter-coded block, and further judges as to whether the coding system of the block belonging to the frame time-sequentially succeeded to the frame to which the subject block, and located at the same position of the subject block corresponds to the intra-coded block, or the inter-coded block; when the judged block corresponds to the intra-coded block, the decoding means (step) inverse-orthogonal-transforms the subject block judged as the intra-coded block, whereas when the judged block corresponds to the intra-coded block, the decoding means (step) inverse-orthogonal-transforms and also dequantizes the subject block judged as the inter-coded block.

As previously explained, the quantized DCT coefficient is directly employed with respect to both the intra-coded type block, and also such an inter-coded type block that the coded type of the block corresponds to the intra-coded type block, and this block is located at the same position as that of the subject block of such a frame time-sequentially subsequent to the frame to which the subject block belongs. As a result, the dequantizing calculation required in the decoding means (decoding step), and also the quantizing calculation required in the coding means (coding step) can be omitted. Accordingly, it is possible to provide the image coding system converting apparatus, the image coding system converting method, and the recording medium, by which the highspeed image coding system converting operation can be provided. Also, the blocks other than the above-explained block may readily cause the image qualities to be deteriorated while the blocks located at the same positions within the time-sequentially subsequent frame are such inter-coded type blocks. However, these blocks may become the intra-coded type blocks in future. Therefore, it is possible to realize such an image coding type converting operation while suppressing the deterioration in the image qualities. It should also be noted that since a total number of frames to be judged by the above-explained block coding system judging step is reduced, the time duration when the deterioration in the image quality occurs can be shortened.

What is claimed is:

1. An image coding system converting apparatus comprising:
    decoding means including separation means which separates input data into coded image data and added information data, said decoding means inverse-orthogonal-transforming said coded image data, said image data being produced by coding a picture in the unit of a block, which owns a plurality of blocks constituted by a predetermined number of pixels, and said added information data containing data amount information of said picture; and
    coding means including allocation means which allocates an upper limit data amount to the respective blocks owned by said picture based upon the data amount information of said picture, said coding means cutting data of a subject block, when a data amount of said subject block is larger than or equal to said upper limit data amount allocated to said subject block, and orthogonal-transforming the cut data.

2. An image coding system converting apparatus comprising:
    decoding means including separation means which separates input data into coded image data and added information data, said decoding means inverse-orthogonal-transforming said coded image data, said image data being produced by coding a picture in the unit of a block, which owns a plurality of blocks constituted by a predetermined number of pixels, and said added information data containing data amount information of a plurality of blocks; and
    coding means including allocation means which sets an upper limit data amount of the respective blocks based upon the data amount information of the plurality of blocks, said coding means cutting data of a subject block, when a data amount of said subject block is larger than or equal to said upper limit data amount set to said subject block, and orthogonal-transforming the cut data.

3. An image coding system converting apparatus comprising:
    decoding means including: separation means which separates input data into coded image data and added information data, said image data being produced by coding a picture in the unit of a block, which owns a plurality of blocks constituted by a predetermined number of pixels, and said added information data containing coding information of each block and quantizing parameter information; and block coding system judging means for judging a coding system of a subject block with reference to coding information of said subject block, said decoding means executing either an inverse-orthogonal-transform operation or an inverse-orthogonal-transform operation and a dequantizing operation with respect to said subject block in response to a judgement result made of said block coding system judging means; and
    coding means including quantizing parameter output means for outputting a new quantizing parameter based upon said quantizing parameter information,
    wherein: said coding means orthogonal-transforms such a block which has been inverse-orthogonal-transformed by said decoding means without quantizing said block, and whereas as to such a block which has been inverse-orthogonal-transformed and dequantized by said decoding means, after said new quantizing parameter outputted from said quantizing parameter output means is multiplied by a DCT coefficient of said block, said coding means quantizes and also orthogonal-transforms said block.

4. An image coding system converting apparatus as claimed in claim 3 wherein:
    said block coding system judging means judges as to whether said subject block corresponds to an intra-coded block, or inter-coded block; and
    when said block coding system judging means judges that said subject block corresponds to the intra-coded block, said decoding means inverse-orthogonal-transforms said subject block judged as the intra-coded block, whereas when said block coding system judging means judges that said subject block corresponds to the inter-coded block, said decoding means inverse-orthogonal-transforms and also dequantizes said subject block judged as the inter-coded block.

5. An image coding system converting apparatus as claimed in claim 3 wherein:
    said block coding system judging means judges as to whether said subject block corresponds to an intra-coded block, or inter-coded block; and
    when said block coding system judging means judges that said subject block corresponds to the intra-coded block, said decoding means inverse-orthogonal-transforms said subject block judged as the intra-coded block, whereas when said block coding system judging means judges that said subject block corresponds to the inter-coded block, and further judges as to whether a coding system of a block belonging to a frame time-sequentially succeeded to the frame to which said subject block, and located at the same position of said subject block corresponds to an intra-coded block, or an inter-coded block, when said judged block corresponds to the intra-coded block, said decoding means inverse-orthogonal-transforms said subject block judged as the intra-coded block, when said judged block corresponds to the inter-coded block, said decoding means inverse-orthogonal-transforms and also dequantizes said subject block judged as the inter-coded block.

6. An image coding system converting apparatus as claimed in claim 3 wherein:

said added information contains bit amount information of each of said blocks;

said block coding system judging means judges as to whether said subject block corresponds to an intra-coded block, or inter-coded block; and when said block coding system judging means judges that said subject block corresponds to the intra-coded block, said decoding means inverse-orthogonal-transforms said subject block judged as the intra-coded block, whereas when said block coding system judging means judges that said subject block corresponds to the inter-coded block, said decoding means either inverse-orthogonal-transforms or inverse-orthogonal-transforms and also dequantizes said subject block judged as the inter-coded block based upon an activity indicative of a degree of coding difficulty which is acquired by multiplying the bit amount of said subject block by a quantizing parameter.

7. An image coding system converting apparatus as claimed in claim 3, 4, 5, or 6 wherein:

said coding means includes transforming-coefficient calculating means for calculating a transforming coefficient based upon a difference in compression ratios before/after the image coding systems are converted; and when the transforming coefficient calculated by said transforming-coefficient calculating means is larger than 1, said quantizing parameter output means sets a new quantizing parameter as a multiplier indicated by said quantizing parameter information; whereas when said transforming coefficient is smaller than 1, said quantizing parameter output means sets a new quantizing parameter as a divisor indicated by said quantizing parameter information and outputs said new quantizing parameter.

8. An image coding system converting apparatus as claimed in claim 7 wherein:

said quantizing parameter output means outputs an original DCT coefficient as a DCT coefficient as said block in such a case that while either the multiplier of the quantizing parameter or the divisor thereof indicated by said quantizing parameter information is used as said new quantizing parameter, a DCT coefficient obtained by multiplying a DCT coefficient of a block by said multiplier, or said divisor becomes smaller than the original DCT coefficient.

9. An image coding system converting apparatus as claimed in claim 7 wherein:

said transforming coefficient is equal to such a value obtained by dividing the compression ratio of the coding system before the coding system is converted by the compression ratio of the coding system after the coding system is converted.

10. An image coding system converting apparatus as claimed in claim 7 wherein:

said added information data contains the data amount information of said picture;

said coding means includes upper limit data amount calculating means for calculating an upper limit data amount of said picture based upon the data amount information of said picture; and said transforming coefficient is equal to such a value calculated by a ratio of the data amount indicated by said data amount information of the picture to said upper limit amount of the picture calculated by said upper limit data amount calculating means.

11. An image coding system converting apparatus as claimed in claim 7 wherein:

said transforming coefficient is equal to a predetermined value which is previously determined in response to the quantizing parameter indicated by the quantizing parameter information every combination between the coding system before being converted and the coding system after being converted.

12. An image coding system converting apparatus as claimed in claim 3, 4, 5, or 6 wherein:

said quantizing parameter output means determines a new quantizing parameter of a subject block based upon quantizing parameters of a plurality of continuous blocks subsequent to said subject block with respect to the block which is inverse-orthogonal-transformed and dequantized by said decoding means.

13. An image coding system converting apparatus as claimed in claim 12 wherein:

when said image coding system converting apparatus outputs image data which has been coded in connection with the MPEG-4 standard, said quantizing parameter output means reads the respective quantizing parameters of a plurality of continuous macroblocks with respect to a subject block which is inverse-orthogonal-transformed and dequantized by said decoding means so as to determine a set region of adjoining macroblocks whose quantizing parameters are smaller than a predetermined value; and determines a quantizing parameter of a subject macroblock based upon quantizing parameters of a plurality of continuous macroblocks subsequent to said subject macroblock within said set region.

14. An image coding system converting method comprising:

a separation step which separates input data into coded image data and added information data, said image data being produced by coding a picture in the unit of a block, which owns a plurality of blocks constituted by a predetermined number of pixels, and said added information data containing data amount information of said picture;

a decoding step for inverse-orthogonal-transforming said coded image data;

an allocation step which allocates an upper limit data amount to the respective blocks owned by said picture based upon the data amount information of said picture; and a coding step for cutting data of a subject block, when a data amount of said subject block is larger than or equal to said upper limit data amount allocated to said subject block, and for orthogonal-transforming the cut data.

15. An image coding system converting method comprising:

a separation step which separates input data into coded image data and added information data, said image data being produced by coding a picture in the unit of a block, which owns a plurality of blocks constituted by a predetermined number of pixels, and said added information data containing data amount information of a plurality of blocks;

a decoding step for inverse-orthogonal-transforming said coded image data;

an allocation step which sets an upper limit data amount of the respective blocks based upon the data amount information of said picture; and a coding step for cutting data of a subject block, when a data amount of said subject block is larger than or equal to said upper limit data amount set to said subject block, and for orthogonal-transforming the cut data.

16. An image coding system converting method comprising:

a separation step which separates input data into coded image data and added information data, said image data being produced by coding a picture in the unit of a block, which owns a plurality of blocks constituted by a predetermined number of pixels, and said added information data containing coding information of each block and quantizing parameter information;

a block coding system judging step for judging a coding system of said subject block with reference to coding information of said subject block;

a decoding step for executing either an inverse-orthogonal transform operation or an inverse-orthogonal-transform operation and a dequantizing operation with respect to said subject block in response to a judgement result made of said block coding system judging step;

a coding step including a quantizing parameter output step for outputting a new quantizing parameter based upon said quantizing parameter information, wherein a first coding step is performed which orthogonal-transforms such a block which has been inverse-orthogonal-transformed by said decoding step without quantizing said block; and a coding step wherein as to such a block which has been inverse-orthogonal-transformed and dequantized by said decoding step, after said new quantizing parameter outputted from said quantizing parameter output step is multiplied by a DCT coefficient of said block, a second coding step quantizes and also orthogonal-transforms said block.

17. An image coding system converting method as claimed in claim 16 wherein:

said block coding system judging step judges as to whether said subject block corresponds to an intra-coded block, or inter-coded block; and when said block coding system judging step judges that said subject block corresponds to the intra-coded block, said decoding step inverse-orthogonal-transforms said subject block judged as the intra-coded block, whereas when said block coding system judging step judges that said subject block corresponds to the inter-coded block, said decoding step inverse-orthogonal-transforms and also dequantizes said subject block judged as the inter-coded block.

18. An image coding system converting method as claimed in claim 16 wherein:

said block coding system judging step judges as to whether said subject block corresponds to an intra-coded block, or inter-coded block; and when said block coding system judging step judges that said subject block corresponds to the intra-coded block, said decoding step inverse-orthogonal-transforms said subject block judged as the intra-coded block, whereas when said block coding system judging step judges that said subject block corresponds to the inter-coded block, and further judges as to whether a coding system of a block belonging to a frame time-sequentially succeeded to the frame to which said subject block, and located at the same position of said subject block corresponds to an intra-coded block, or an inter-coded block, when said judged bock corresponds to the intra-coded block, said decoding step inverse-orthogonal-transforms said subject block judged as the intra-coded block, when said judged block corresponds to the inter-coded block, said decoding step inverse-orthogonal-transforms and also dequantizes said subject block judged as the inter-coded block.

19. An image coding system converting method as claimed in claim 16 wherein:

said added information contains bit amount information of each of said blocks;

said block coding system judging step judges as to whether said subject block corresponds to an intra-coded block, or inter-coded block; and when said block coding system judging step judges that said subject block corresponds to the intra-coded block, said decoding step inverse-orthogonal-transforms said subject block judged as the intra-coded block, whereas when said block coding system judging step judges that said subject block corresponds to the inter-coded block, said decoding step either inverse-orthogonal-transforms or inverse-orthogonal-transforms and also dequantizes said subject block judged as the inter-coded block based upon an activity indicative of a degree of coding difficulty which is acquired by multiplying the bit amount of said subject block by a quantizing parameter.

20. An image coding system converting method as claimed in claim 16, 17, 18, or 19 wherein:

said quantizing parameter output step includes a transforming-coefficient calculating step for calculating a transforming coefficient based upon a difference in compression ratios before/after the image coding systems are converted; and when the transforming coefficient calculated by said transforming-coefficient calculating step is larger than 1, said quantizing parameter output step sets a new quantizing parameter as a multiplier indicated by said quantizing parameter information; whereas when said transforming coefficient is smaller than 1, said quantizing parameter output step sets a new quantizing parameter as a divisor indicated by said quantizing parameter information and outputs said new quantizing parameter.

21. An image coding system converting method as claimed in claim 20 wherein:

said quantizing parameter output step outputs an original DCT coefficient as a DCT coefficient as said block in such a case that while either the multiplier of the quantizing parameter or the divisor thereof indicated by said quantizing parameter information is used as said new quantizing parameter, a DCT coefficient obtained by multiplying a DCT coefficient of a block by said multiplier, or said divisor becomes smaller than the original DCT coefficient.

22. An image coding system converting method as claimed in claim 20 wherein:

said transforming coefficient is equal to such a value obtained by dividing the compression ratio of the coding system before the coding system is converted by the compression ratio of the coding system after the coding system is converted.

23. An image coding system converting method as claimed in claim 20 wherein:

said added information data contains the data amount information of said picture;

said coding step includes an upper limit data amount calculating step for calculating an upper limit data amount of said picture based upon the data amount information of said picture; and said transforming coefficient is equal to such a value calculated by a ratio of the data amount indicated by said data amount information of the picture to said upper limit amount of the picture calculated by said upper limit data amount calculating step.

24. An image coding system converting method as claimed in claim 20 wherein:

said transforming coefficient is equal to a predetermined value which is previously determined in response to the quantizing parameter indicated by the quantizing parameter information every combination between the coding system before being converted and the coding system after being converted.

25. An image coding system converting method as claimed in claim 16, 17, 18, or 19 wherein:

said quantizing parameter output step determines a new quantizing parameter of a subject block based upon quantizing parameters of a plurality of continuous blocks subsequent to said subject block with respect to the block which is inverse-orthogonal-transformed and dequantized by said decoding step.

26. An image coding system converting method as claimed in claim 25 wherein:

when said image coding system converting method outputs image data which has been coded in connection with the MPEG-4 standard, said quantizing parameter output step reads the respective quantizing parameters of a plurality of continuous macroblocks with respect to a subject block which is inverse-orthogonal-transformed and dequantized by said decoding step so as to determine a set region of adjoining macroblocks whose quantizing parameters are smaller than a predetermined value; and determines a quantizing parameter of a subject macroblock based upon quantizing parameters of a plurality of continuous macroblocks subsequent to said subject macroblock within said set region.

27. A recording medium for recording thereon as a computer readable program, the image coding system converting method as recited in any one of the preceding claim 14 to 19.

* * * * *